United States Patent
Okagawa et al.

(10) Patent No.: US 7,505,476 B2
(45) Date of Patent: Mar. 17, 2009

(54) PACKET TRANSFER PATH CONTROL APPARATUS AND CONTROL PROGRAM THEREFOR

(75) Inventors: Hiroshi Okagawa, Kawasaki (JP); Jinichi Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 852 days.

(21) Appl. No.: 10/799,481

(22) Filed: Mar. 11, 2004

(65) Prior Publication Data

US 2005/0089013 A1 Apr. 28, 2005

(30) Foreign Application Priority Data

Oct. 27, 2003 (JP) ............................. 2003-365970

(51) Int. Cl.
*H04L 12/08* (2006.01)

(52) U.S. Cl. ...................................... 370/413; 370/390

(58) Field of Classification Search ................. 370/358, 370/392, 418, 419, 390, 413
See application file for complete search history.

(56) References Cited

U.S. PATENT DOCUMENTS

| | | | | |
|---|---|---|---|---|
| 5,724,358 | A * | 3/1998 | Headrick et al. ............. | 370/418 |
| 6,278,709 | B1 * | 8/2001 | Walker et al. ............... | 370/392 |
| 6,308,218 | B1 * | 10/2001 | Vasa .......................... | 709/238 |
| 6,400,715 | B1 * | 6/2002 | Beaudoin et al. ............ | 370/392 |
| 6,449,283 | B1 * | 9/2002 | Chao et al. .................. | 370/461 |
| 6,611,521 | B1 * | 8/2003 | McKay et al. ............... | 370/392 |
| 6,618,373 | B1 * | 9/2003 | Subramaniam ............. | 370/390 |
| 6,687,247 | B1 * | 2/2004 | Wilford et al. .............. | 370/392 |
| 6,781,998 | B1 * | 8/2004 | Karlsson ................ | 370/395.71 |
| 6,895,006 | B1 * | 5/2005 | Tasaki et al. ................ | 370/390 |
| 6,947,413 | B2 * | 9/2005 | Wakabayashi et al. ...... | 370/358 |
| 7,016,365 | B1 * | 3/2006 | Grow et al. ................. | 370/413 |
| 2002/0012327 | A1 * | 1/2002 | Okada ........................ | 370/328 |
| 2002/0031092 | A1 * | 3/2002 | Wakabayashi et al. ...... | 370/249 |
| 2003/0206549 | A1 * | 11/2003 | Mody et al. ................. | 370/390 |
| 2003/0223466 | A1 * | 12/2003 | Noronha et al. ............. | 370/537 |

(Continued)

FOREIGN PATENT DOCUMENTS

JP 10-93589 4/1998

(Continued)

OTHER PUBLICATIONS

Notice of Rejection Ground mailed Nov. 4, 2008, from the corresponding Japanese Application.

*Primary Examiner*—Ricky Ngo
*Assistant Examiner*—Ben H Liu
(74) *Attorney, Agent, or Firm*—Katten Muchin Rosenman LLP

(57) ABSTRACT

The process of transferring a packet including a multicast packet can be performed at a high speed, and the output order between unicast and multicast can be guaranteed by a system including a unit 1 for determining an output port through which a packet input through an input port is to be output, and assigning output order identification information to the packet, a unit 2 for storing data of an input packet; and units 3a, 3b, . . . which correspond to each of a plurality of output ports, reading data of a packet determined by the unit 1 to be output through a corresponding output port from the unit 2 in the output order indicated by output order identification information, and outputs the read data through a corresponding output port.

13 Claims, 22 Drawing Sheets

U.S. PATENT DOCUMENTS

| | | | |
|---|---|---|---|
| 2004/0066791 A1* | 4/2004 | Wu et al. | 370/419 |
| 2004/0143655 A1* | 7/2004 | Narad et al. | 709/223 |
| 2005/0002334 A1* | 1/2005 | Chao et al. | 370/230 |
| 2006/0050690 A1* | 3/2006 | Epps et al. | 370/359 |

FOREIGN PATENT DOCUMENTS

| | | |
|---|---|---|
| JP | 10-243009 | 9/1998 |
| JP | 2002-111716 | 4/2002 |
| JP | 2003-23461 | 1/2003 |
| JP | 2003-158532 | 5/2003 |
| JP | 2005-045626 | 2/2005 |
| WO | WO 01/41364 | 6/2001 |

* cited by examiner

| PREAMBLE | DESTINATION ADDRESS | TRANSMITTER ADDRESS | Ether Type | DATA | FCS |
|---|---|---|---|---|---|

FIG. 3 PRIOR ART

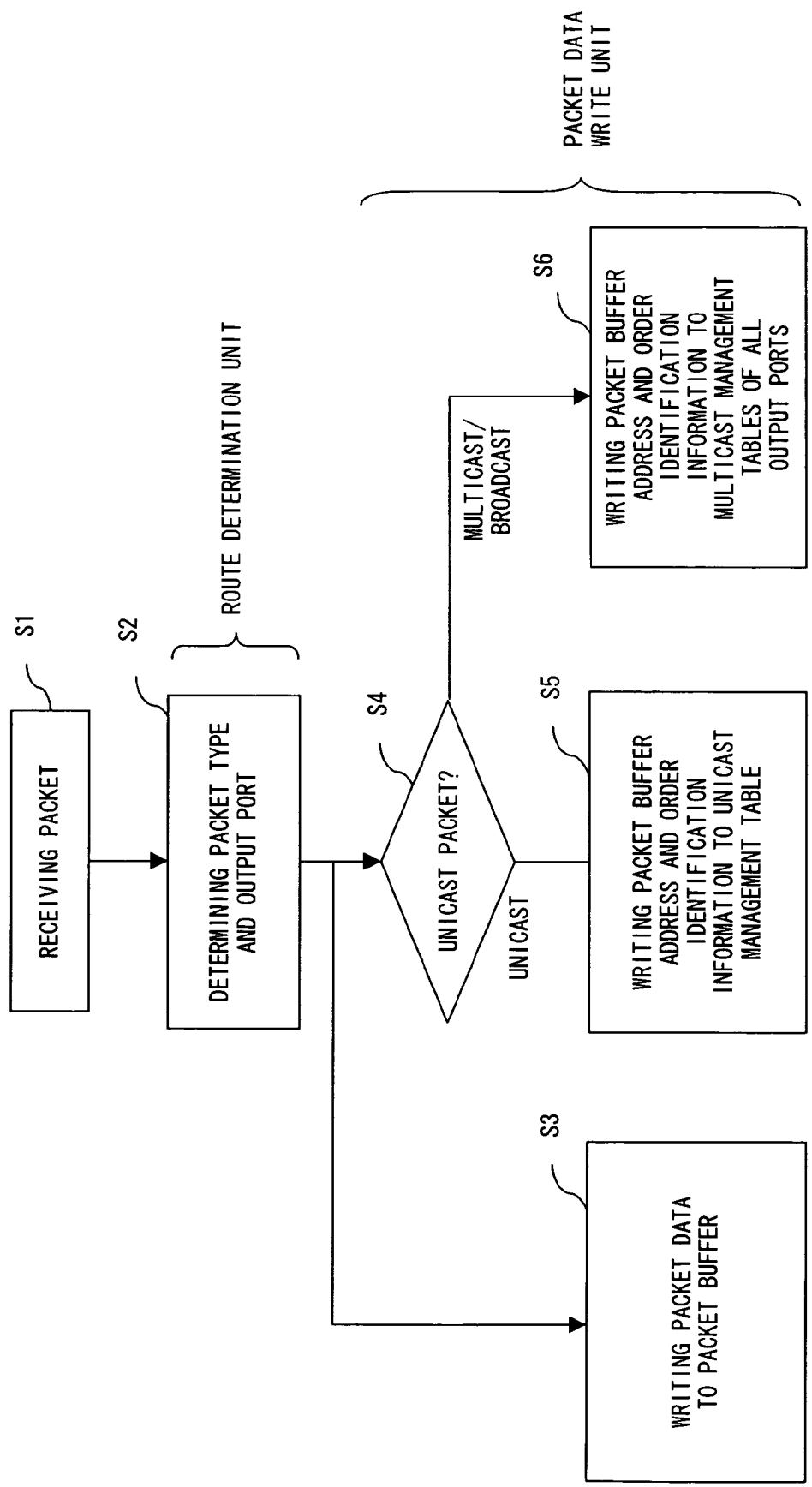
F I G. 5

| OUTPUT PORT | SERIAL NUMBER. |
|---|---|
| 01 | xxxxxx |
| 02 | yyyyyy |
| . . . . . . . . . . . | . . . . . . . . . . |

FIG. 9

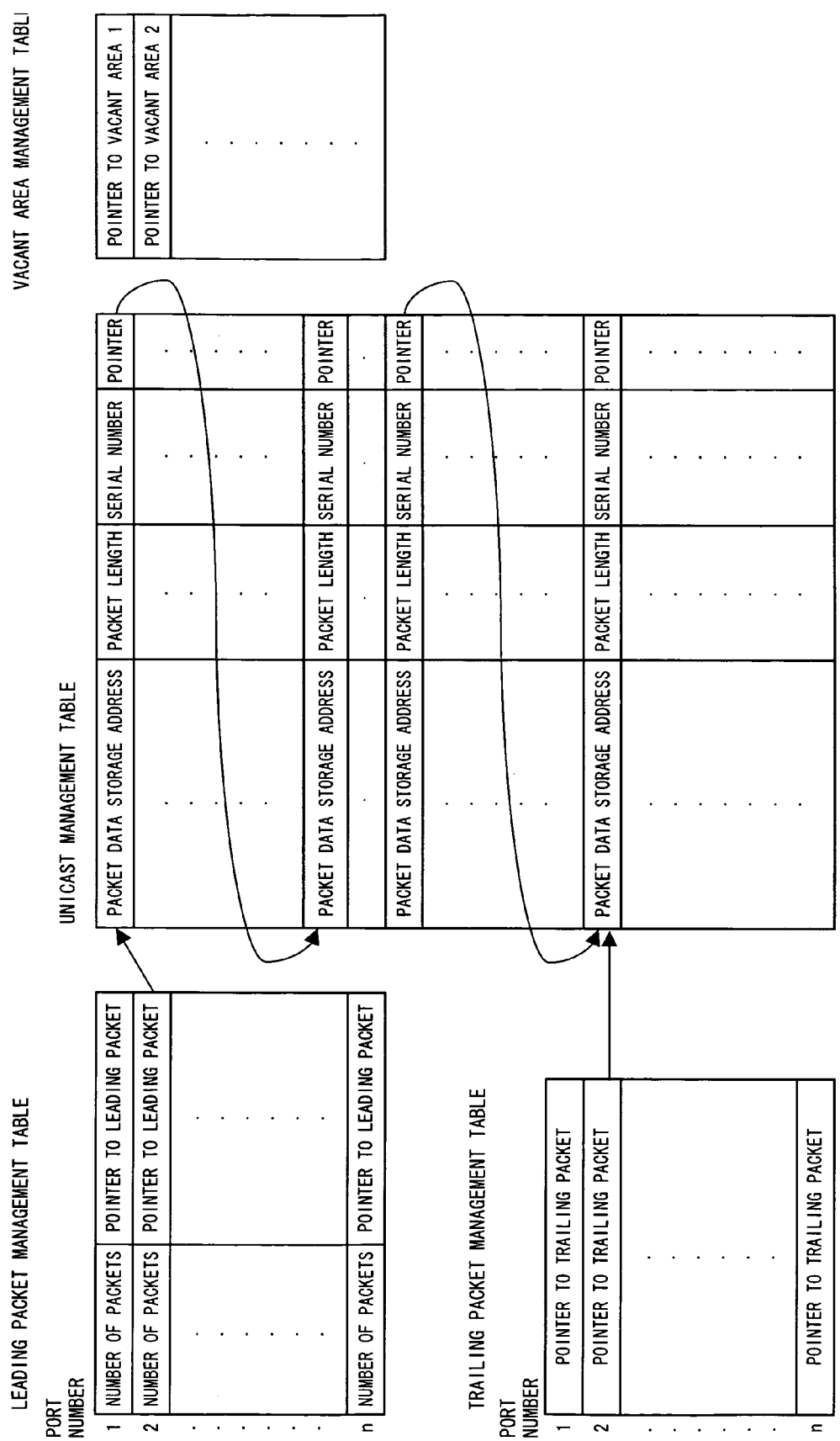
F I G. 11

| OUTPUT PORT | UT POINTER |
|---|---|
| 01 | xxxxxx |
| 02 | yyyyyy |
| . . . . . . . . . . | . . . . . . . . . . |

F I G. 1 8

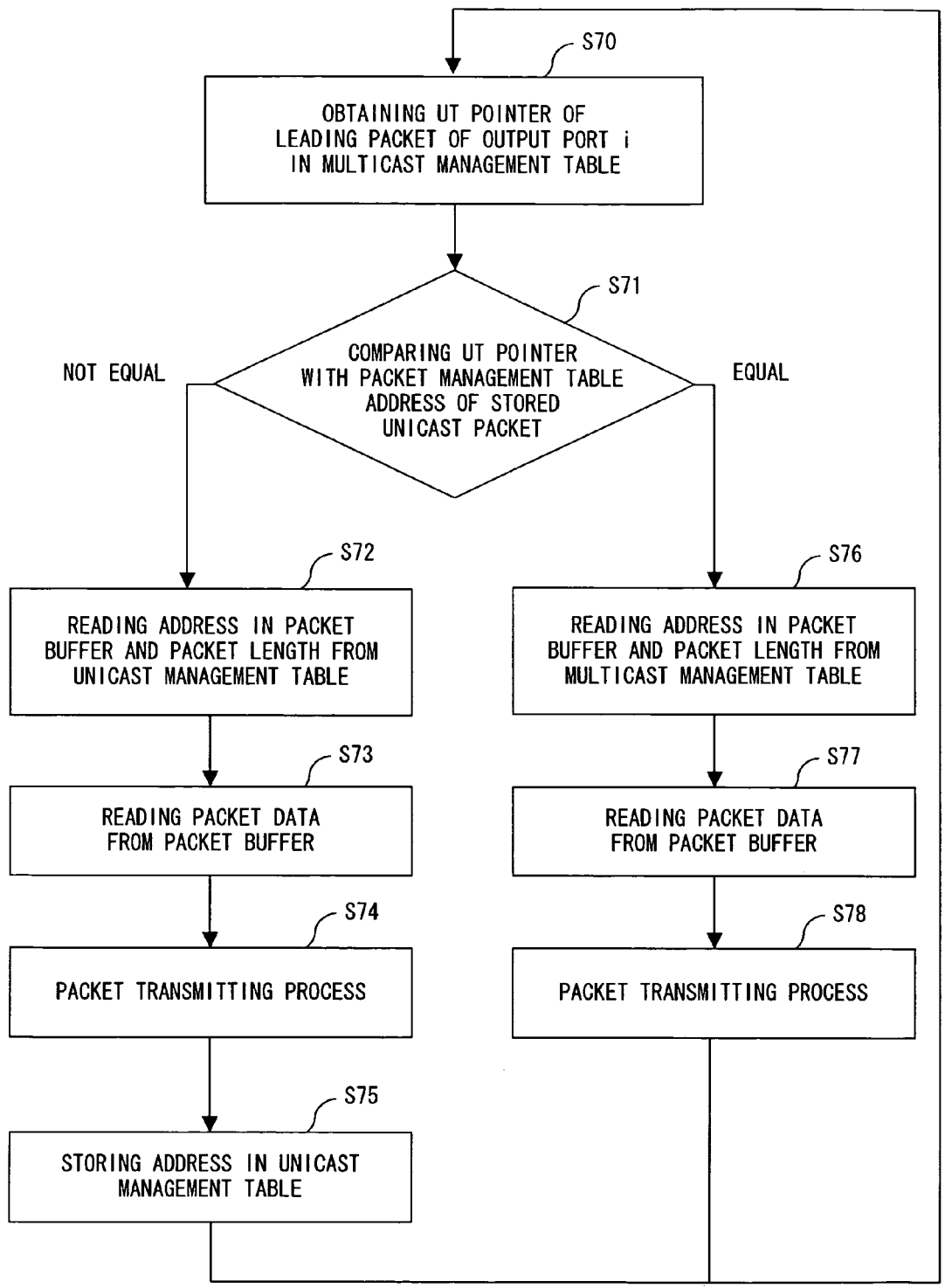
F I G. 2 2

PACKET TRANSFER PATH CONTROL APPARATUS AND CONTROL PROGRAM THEREFOR

BACKGROUND OF THE INVENTION

1. Field of the Invention

The present invention relates to a packet communications system, and more specifically to a packet transfer path control apparatus for transferring a variable-length or fixed-length packet in a unicast system or a multicast/broadcast system, and a control program for use with the apparatus.

2. Description of the Related Art

A communications system operated using a variable-length packet such as an Ethernet (registered trademark), etc. and a fixed-length packet in an asynchronous transfer mode (ATM), etc. has been widely used. The packet transfer path control apparatus in the above-mentioned packet transfer system has the function of transmitting an input packet from an output port determined according to the destination information in the packet. A packet having only one output port corresponding to the destination information, i.e., a packet input from one input port and output through one output port, is referred to as a unicast packet. A packet whose destination information designates a plurality of output ports, and which is input through one input port and output from a plurality of output ports is referred to as a multicast packet. A packet whose destination information corresponds to all output ports, or which has no determined output port, and is eventually output from all output ports is referred to as a broadcast packet.

In normal one-to-one communications, a unicast packet is mainly used in establishing communications. On the other hand, since packets are simultaneously transmitted from one broadcast server to a plurality of subscribers in one-to-many communications, the load of the server is heavy when the communications are performed with all subscribers through one-to-one unicast packet, thereby failing in efficiently using the band of communications circuit connected to the server. Therefore, in the packet transfer path control apparatus, for example, a system of practically copying a packet transmitted from a broadcast server and transferring it as a multicast/broadcast packet to a subscriber has been used.

FIG. 1 is an explanatory view of a multicast packet transfer system using the above-mentioned packet transfer path control apparatus. In FIG. 1, a multicast packet output from a broadcast server 41 is practically copied by a path control device 42, output from a plurality of output ports, thereby allowing subscribers 1 through 3 to receive the packets output from the broadcast server. By providing the path control device 42 for copying the packet in the place closest possible to the subscribers, the one-to-many communications can be realized without increasing the load of the broadcast server and the communications system.

FIG. 2 is a block diagram of the configuration of the conventional packet transfer path control apparatus. FIG. 3 shows an example of the format of a transferred packet. In FIG. 2, the type of a packet is determined, that is, it is determined by a corresponding route determination unit 51 whether a packet input from an input port 50 is a unicast packet or a multicast packet to be output from a plurality of output ports. Furthermore, depending on the contents of an output port management table 52, an output port through which a packet is to be output according to the destination address information about the packet is determined. The information about the packet type and the output port is transmitted together with packet data to a packet data write unit 53.

The packet data write unit 53 writes packet data to a packet buffer 54, and writes to a packet management table 55 an address, etc. in the packet buffer 54 storing the packet data as the management information about the packet corresponding to the output port through which the packet is to be output. A packet data read unit 56 corresponding to each output port 57 reads from the packet buffer 54 according to the management information in the packet management table 55 a packet to be output from the corresponding output port 57, and outputs the packet from the output port 57.

In the packet format shown in FIG. 3, for example, in the example of the Ethernet frame, the number of an output port through which a packet is to be output is stored in the output port management table 52 shown in FIG. 2 corresponding to the destination address of the packet stored after the preamble of the frame, and an input packet is output from the output port.

With the diffusion of the broadband communications technology among common families, the demand for the one-to-many communications technology such as broadcast services, multipoint video phones, etc. that uses multicast/broadcast packets has been quickly increased. To transfer a multicast packet and a broadcast packet, it is necessary to perform a process of copying a packet in the packet transfer path control apparatus as described above. However, the copying process requires a lot of time in the path control device having a large number of output ports, and there occurs a long time delay in the subsequent packet processing including a unicast packet, thereby causing the problem that the performance of the path control device is lowered.

In this connection, there are the following three literatures relating to the conventional technology of the packet transfer technology in the communications system in which a unicast packet and a multicast packet are transferred as described above.

[Literature 1] Japanese Patent Application Laid-open No. Hei 10-2430095 "Switching Hub"

[Literature 2] National Publication of International Patent Application No. 2003-516029 "Method and Apparatus for Wire Speed for IP Multicast Transfer"

[Literature 3] Japanese Patent Application Laid-open No. 2003-158532 "Apparatus and Method for Transferring Multicast Transmission Packet of Multi-MACLSI"

In Literature 1, the transmission path of a unicast packet is separated from that of a multicast packet so that the multicast packet can be transmitted by setting 1-to-N connection between an input port and output ports using a repeating buffer, and the same packets can be simultaneously transmitted from a plurality of output ports.

In Literature 2, an IP multicast packet received for an IP multicast group is stored in the memory, and a pointer to the area of a packet in the memory is stored for each port to which a copy of a packet is to be transferred. Thus, the IP multicast packet reaching the input port and a copy of a receiving packet are transferred to each member of the IP multicast group at the wire speed.

In Literature 3, in the packet transfer apparatus having a plurality of ports, multicast can be efficiently transferred to an upper device by providing a system of simultaneously writing a plurality of ports to the transmission bus which is an interface with the upper device.

However, in the conventional technology, there is the problem that the packet order between the unicast packet and the multicast/broadcast packet cannot be guaranteed. For example, In Literature 3, it is proposed that a queue exclusive for multicast to which a multicast/broadcast packet is to be written is provided so that the process of copying a packet can be performed in reading operation for each output port. However, since a multicast packet is output by priority, an unicast packet arriving earlier cannot be output until the packet in the queue exclusive for multicast is output, thereby failing in guaranteeing the output order between a unicast packet and a multicast packet.

When the output order of packets is ignored, the upper layer at the packet receiver, for example, the TCP detects it, and a request to resend a packet is issued to a transmitter. If such requests to send are simultaneously issued from a plurality of terminals, congestion frequently occurs in a network, which is not desired in operating the network.

SUMMARY OF THE INVENTION

The present invention has been developed to solve the above-mentioned problems, and aims at quickly performing the process of transferring packets and guaranteeing the output order of packets between unicast packets and multicast packets by providing a multicast management table storing the management information about a multicast packet for each output port, and managing the output of packets by assigning a serial number to each input packet for each output port.

In the present invention, the packet transfer path control apparatus for controlling the transfer of a unicast packet and a multicast packet comprises an output port determination unit, a packet data storage unit, and a plurality of packet output units.

The output port determination unit determines an output port through which a packet input through any of one or more input ports is to be output, and assigns output order identification information designating the output order of the packet, and the packet data storage unit stores the data of the input packet.

A plurality of packet output units correspond to the respective output ports, reads from the packet data storage unit the data of the packet determined by the output port determination unit to be output through the corresponding output port in the output order indicated by the above-mentioned output order identification information, and outputs it through the corresponding output port.

The packet transfer path control apparatus according to the present invention also comprises an output port determination unit, a pointer storage unit, a packet data storage unit, and a plurality of packet output units.

The output port determination unit determines an output port through which a packet is to be output. The packet data storage unit stores the data of the input packet as described above.

The pointer storage unit stores either a last (or most recently) input one of the unicast packets input through at least one input port and bound for each of the plurality of output ports, or a pointer to the packet management data of the unicast packet in a location corresponding to the output port through which the unicast packet is to be output.

The plurality of packet output units correspond to the plurality of respective output ports as described above, read from the packet data storage unit the data of the packet determined by the output port determination unit to be output from the corresponding output port based on the storage contents of the pointer storage unit in the output order in which the order of the input/output of the unicast packets and multicast packets is guaranteed, and output it through the corresponding output port.

A packet transfer path control program according to the present invention is used by a computer for controlling the transfer of a unicast packet and a multicast packet, and comprises a procedure of determining an output port through which a packet input through an input port is to be output, a procedure of writing order identification information assigned for each output port specified for a packet or corresponding to the input order of all packets in a table storing the management information about a unicast packet for each output port through which a packet is to be output when the input packet is a unicast packet, and a procedure of writing order identification information assigned for each output port specified for a packet or corresponding to the input order of all packets in a table storing the management information about a multicast packet for each output port through which a packet is to be output when the input packet is a multicast packet.

The packet transfer path control program according to the present invention also comprises a procedure of determining an output port through which a packet input through an input port is to be output, a procedure of, when the input packet is a unicast packet, storing a storage address in a first table storing data of the input unicast packet or management information about the input unicast packet in association with the output port through which the input unicast packet is to be output, and a procedure of, when the input packet is a multicast packet, writing in a second table storing for each output port the management information about the input multicast packets to be output through the output port a storage address in a table storing for each output port the management information about the input unicast packets or a storage address in a table storing the data of the input multicast packet.

As described above, according to the present invention, the order of the input/output of a unicast packet and a multicast packet can be guaranteed by assigning the output order identification information to an input packet, and outputting a packet through an output port through which the packet is to be output in the output order, or using a pointer to the input unicast packet or the management data of the packet corresponding to each output port.

BRIEF DESCRIPTION OF THE DRAWINGS

FIG. 3 shows an example of a packet format;

FIG. 5 is a flowchart of the basic process performed when a packet is received according to the present invention;

FIG. 9 shows an example of a storage format of the serial number management table;

FIG. 11 shows an example of the configuration of the unicast management table according to the first embodiment of the present invention;

FIG. 18 shows an example of a storage format of the UT pointer management table;

FIG. 22 is a flowchart of the process performed when a packet is transmitted according to the second embodiment of the present invention.

DETAILED DESCRIPTION OF THE PREFERRED EMBODIMENTS

Figure 4:
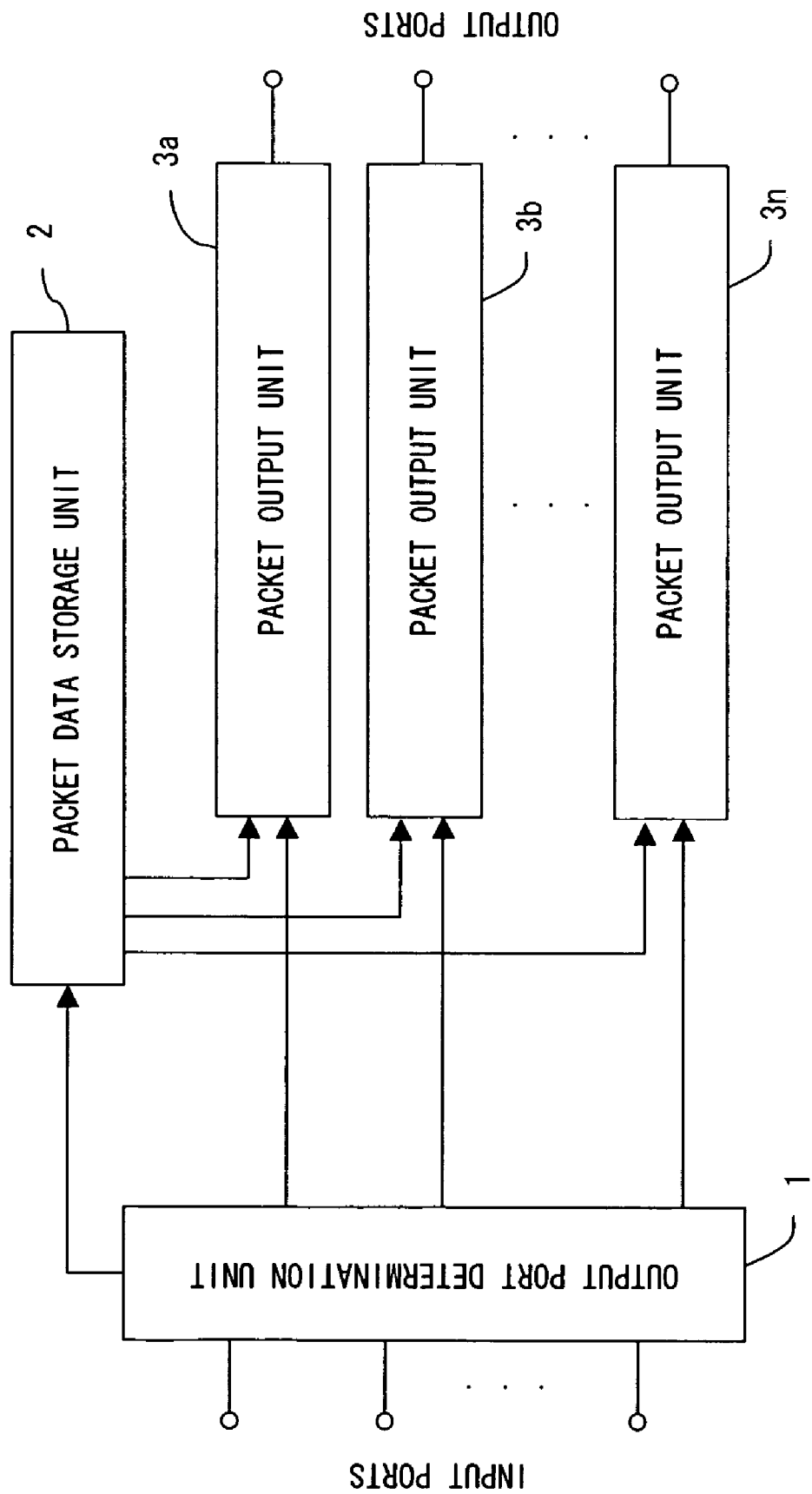
FIG. 4 is a block diagram of the configuration showing the principle of the packet transfer path control apparatus.

FIG. 4 is a block diagram of the configuration showing the principle of the packet transfer path control apparatus according to the present invention. That is, FIG. 4 is a block diagram of the configuration showing the principle of the packet transfer path control apparatus for controlling the transfer of a unicast packet to be input from any of one or more input ports and to be output from one of a plurality of output ports, and a multicast packet to be output from the plurality of output port.

In FIG. 4, an output port determination unit 1 determines an output port through which a packet is input through an input port, and assigns output order identification information designating the output order to the packet. A packet data storage unit 2 stores the data of an input packet. Packet output units 3a, 3b, . . . , and 3n correspond to the respective output ports read a packet determined by the output port determination unit 1 to be output from a corresponding output port from the packet data storage unit 2 in the output order indicated by the output order identification information, and output it from the corresponding output port.

The packet transfer path control apparatus can further comprise a unicast packet management information storage unit for storing packet management information including the storage position in the packet data storage unit 2 for the data of unicast packets associated with each of the plurality of output ports and the output order identification information, and a multicast packet management information storage unit for storing similar packet management information for a multicast packet to be output from each output port as with the unicast packet.

Additionally, the output order identification information also can be a serial number indicating the input order of the entire packets input through all input ports, or a serial number for each output port indicating the input order of a packet to be output for the output port. The packet output unit compares the output order identification information about the unicast packet to be output next in the packets whose packet management information is stored in the unicast packet management information storage unit with the output order identification information about the multicast packet to be output next in the packets whose management information is stored in the multicast packet management information storage unit, and can determine the packet to be output next from a corresponding output port.

The packet transfer path control apparatus according to the present invention can further comprise a pointer storage unit in addition to the output port determination unit, the packet data storage unit, and the packet output units 3 corresponding to the respective output ports as shown in FIG. 4. In this example, it is assumed that the output port determination unit does not assign the output order identification information.

The pointer storage unit stores a pointer to a unicast packet input close in time in the unicast packets input from the input port, or the packet management data of the unicast packet corresponding to the output port through which the unicast packet is to be output. The packet output unit reads from the packet data storage unit a packet determined to be output from the corresponding output port in the output order in which the order of the input/output of unicast packets and multicast packets is guaranteed based on the storage contents of the pointer storage unit, and outputs it from the corresponding output port.

Furthermore, the packet transfer path control apparatus comprises a unicast packet management information storage unit for storing a storage position, etc. of a unicast packet in the packet data storage unit as packet management information as describe above, and a multicast packet management information storage unit for storing as packet management information the storage position of the data of a multicast packet in the packet data storage unit, a value, etc. of a pointer read from a pointer storage unit corresponding to the output port through which the multicast packet is to be output when the multicast packet is input.

The above-mentioned pointer can also point to the storage position in the packet data storage unit of a unicast packet input close in time, or the storage position of packet management information corresponding to the unicast packet in the unicast packet management information storage unit, and each packet output unit stores the storage position of the packet management information in the unicast packet management information storage unit corresponding to the unicast packet output immediately before through the own output port associated with the packet output unit, compares the stored storage position when a next packet is to be output from the own output port, with the value of a pointer for in the next output candidate of the multicast packets whose packet management information is stored in the multicast packet management information storage unit, outputs a multicast packet when they match, and outputs a unicast packet when they do not match.

A packet transfer control program according to the present invention is used by a computer for controlling the transfer of a unicast packet and a multicast packet, and comprises a procedure of determining an output port through which a packet input through an input port is to be output, a procedure of writing order identification information for each output port specified for a packet or corresponding to the input order of all packets in a table storing the management information about the unicast packets for each output port when the input packet is a unicast packet, and a procedure of writing order identification information for each output port specified for a packet or corresponding to the input order of all packets in a table storing the management information about the multicast packet for each output port when the input packet is a multicast packet.

The transfer control program can further allow the computer to perform a procedure of reading the order identification information about a unicast packet to be output next from the table storing unicast packet management information corresponding to an output port and reading the order identification information about a multicast packet to be output next from a table storing the multicast packet management information, and a procedure of comparing the two read values of order identification information and determining which is to be output from the output port, a unicast packet or a multicast packet.

The packet transfer path control program according to the present invention also comprises a procedure of determining an output port through which a packet input through an input port is to be output, a procedure of storing, when the packet is a unicast packet, a storage address in a table storing the data of the packet or the management information about the packet in association with the output port through which the packet is to be output, and a procedure of writing, when the packet is a multicast packet, in a table storing the management information about the multicast packets for each output port a storage address in a table storing the data of the unicast packet or the management information about the unicast packet in association with the output port.

The transfer control program can also be used to direct a computer to perform a procedure of reading a storage address in a table storing the management information about the unicast packet corresponding to a multicast packet to be next output, or a storage address in a table storing the data of a unicast packet from a table storing the management information about a multicast packet for each output port, a procedure of comparing the read storage address in the table storing the management information about the unicast packet or the storage address in the table storing the data of the unicast packet with the storage address in the table storing the management information about the last output unicast packet or the storage address in the table storing the data of the packet, and determining which is to be output from the output port, a unicast packet or a multicast packet, and a procedure of, when a unicast packet is output, storing a storage address in the table storing the management information about the unicast packet to be output or a storage address in the table storing the data of the packet.

As described above, according to the present invention, the output order of packets can be managed using a serial number indicating the input order of a packet, or a UT pointer indicating the last input unicast multicast unicast packet corresponding to each output port.

Figure 1:
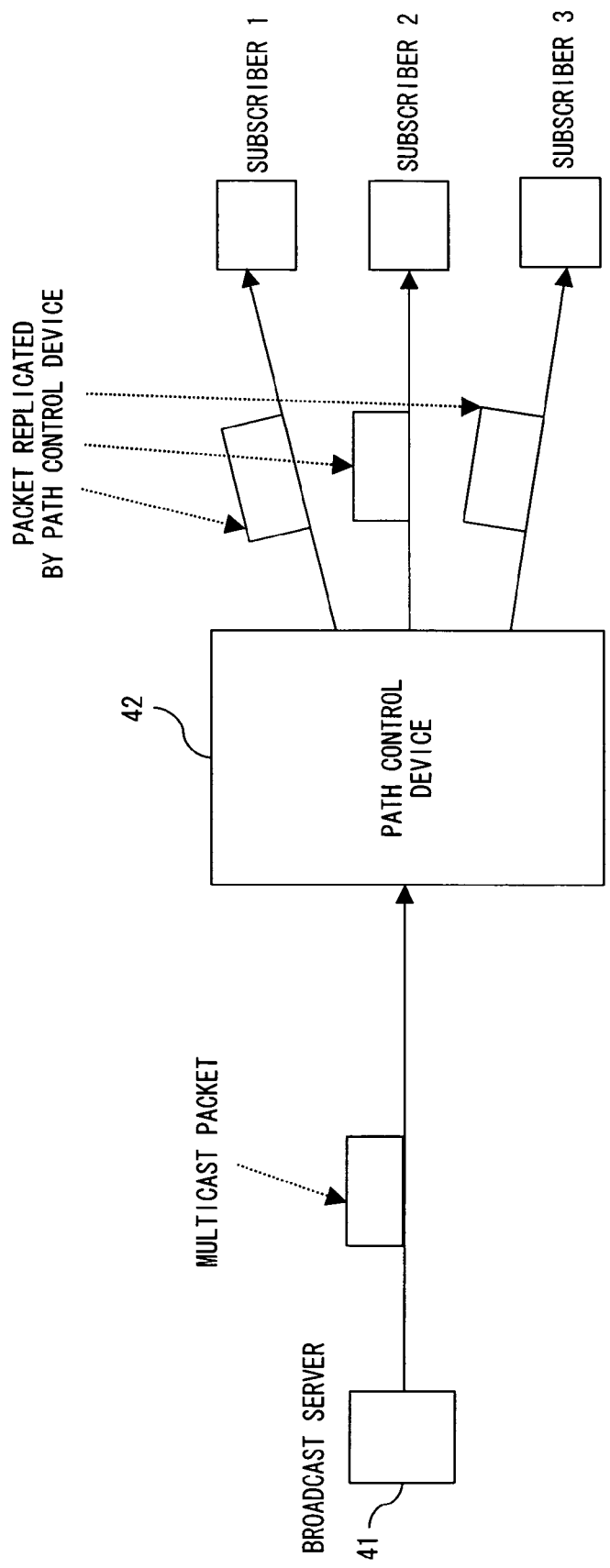
FIG. 1 is an explanatory view of the multicast packet output system by the packet transfer path control apparatus.
Figure 2:
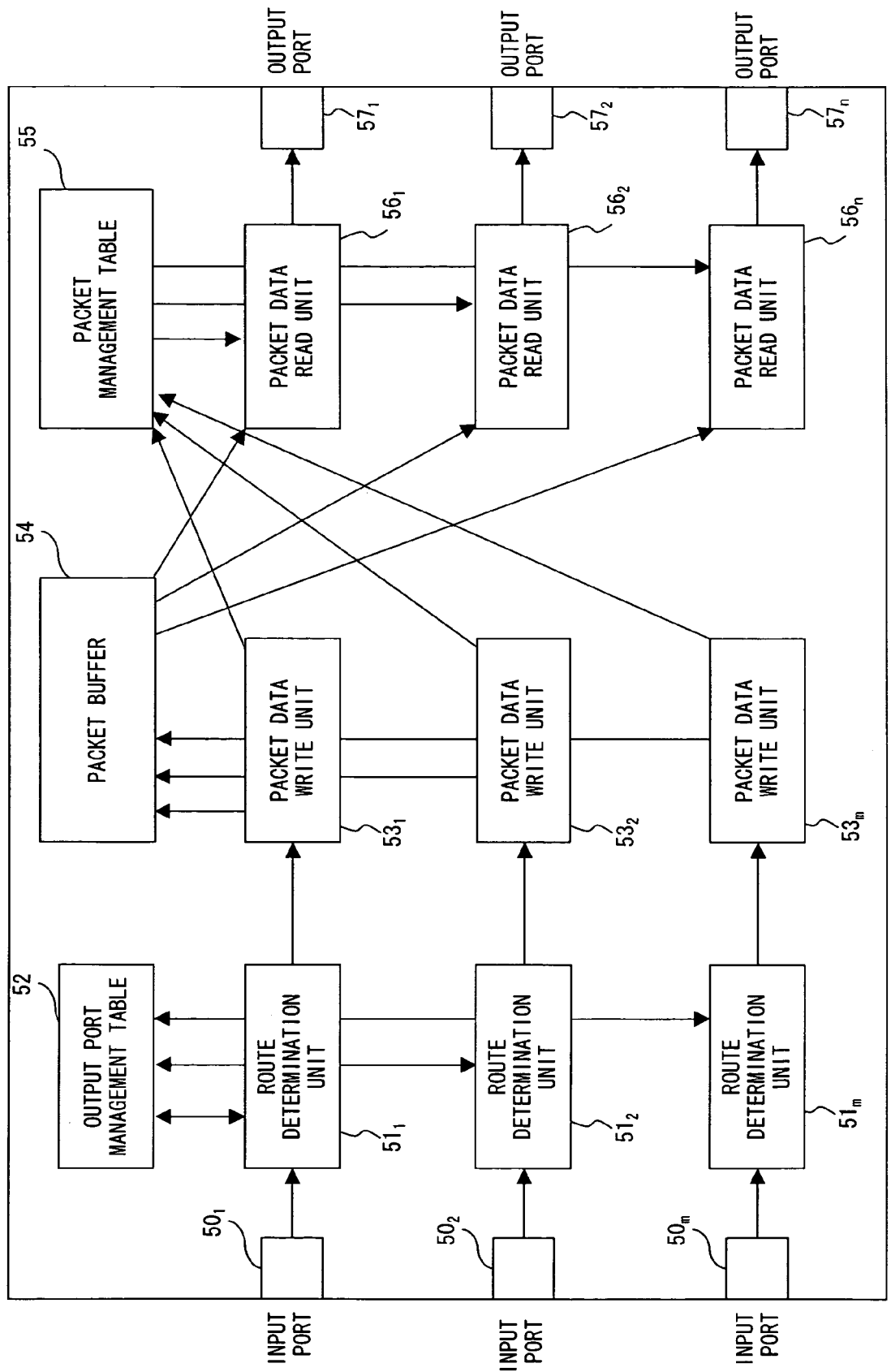
FIG. 2 is a block diagram of the configuration of the conventional technology of the packet transfer path control apparatus.

Before describing in detail about the preferred embodiments of the present invention, the basic processes performed by the packet transfer path control apparatus of the present invention when a packet is received and when a packet is transmitted are explained below by referring to FIGS. 5 and 6. When a packet is received in step S1 shown in FIG. 5, the packet type of the received packet, i.e., a unicast packet or a multicast packet, and an output port through which the packet is output are determined in step S2. In step S3, as in the conventional technology shown in FIG. 2, packet data is written to the packet buffer. In parallel, it is determined whether or not the received packet is a unicast packet in step S4.

When the packet is a unicast packet, the address of the packet in the packet buffer and the order identification information for guarantee of the output order of the packet are written in step S5 to the unicast management table storing the management information about the unicast packet for the transfer or output management of a unicast packet in the present invention. When the packet is a multicast packet or a broadcast packet, the address of the packet in the packet buffer and the order identification information for guarantee of the output order of the packet are written in step S6 to relevant ones of the multicast management tables provided to respective output ports in the present invention, i.e., the multicast management tables corresponding to all output ports through which multicast packets (including broadcast packets) are output. That is, in the present invention, the packet management table 55 shown in FIG. 2 of the conventional technology is fundamentally divided into a unicast management table and a multicast management table, and the multicast management table is provided one to one to each output port, i.e., each packet data read unit.

Figure 6:
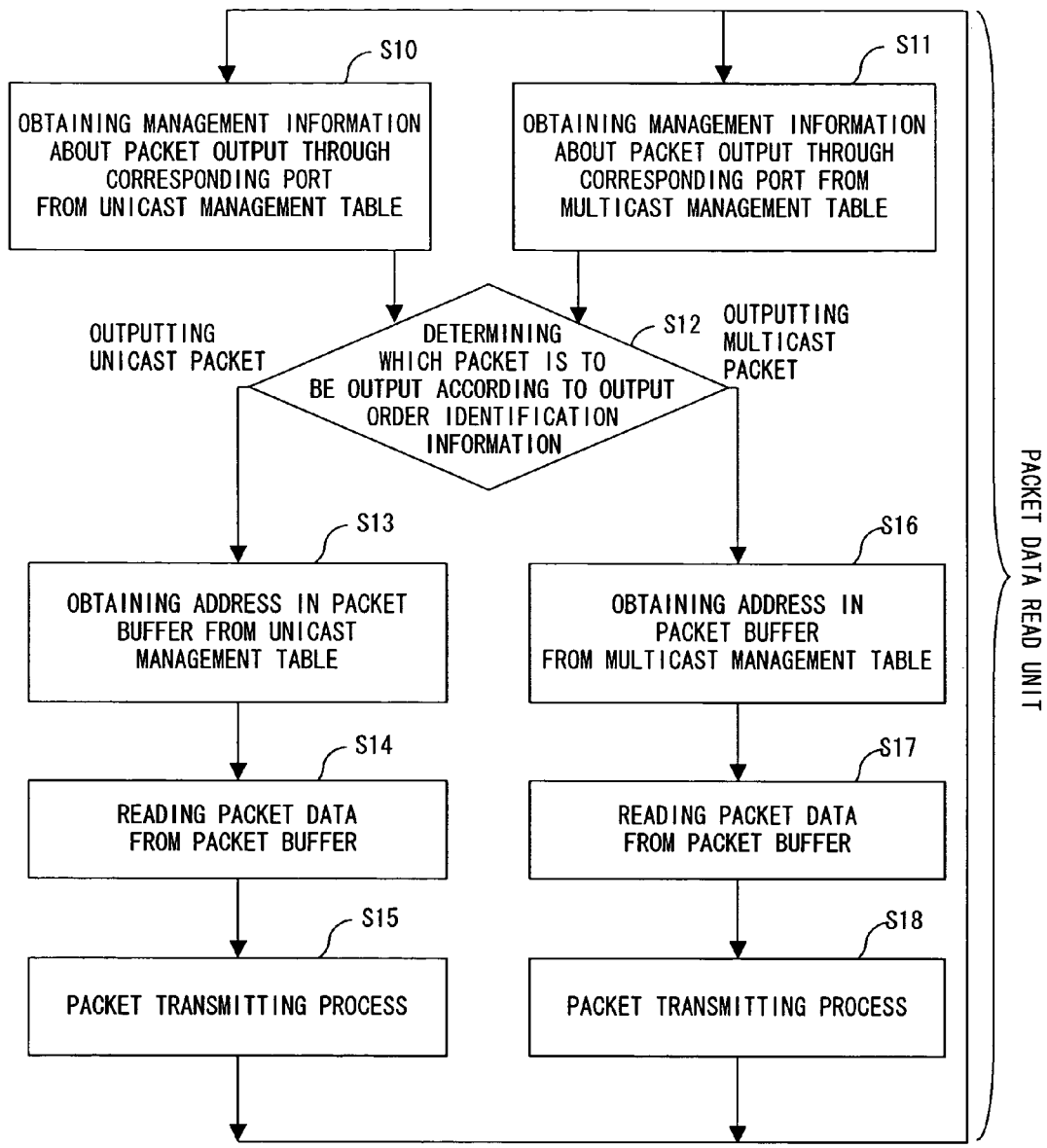
FIG. 6 is a flowchart of the basic process performed when a packet is transmitted according to the present invention.

FIG. 6 is a flowchart of the basic process performed when a packet is transmitted in the present invention. In FIG. 6, when a packet is transmitted, as in the conventional technology shown in FIG. 2, a packet transmission process is carried our by a packet data read unit corresponding to a output port through which the packet is to be transmitted.

In this process, the management information corresponding to the packet to be output next through a corresponding output port is retrieved from the unicast management table in step S10. In parallel, in step S11, the management information corresponding to a multicast packet to be output next from a corresponding output port is retrieved from a relevant multicast management table. In step S12, the retrieved management information, i.e., the order identification information in this example, is compared with each other, and it is determined which packet is to be output, a unicast packet or a multicast packet. When a unicast packet is to be output, the address at which the packet data is written in the packet buffer is obtained from the unicast management table. In step S14, packet data is read from the packet buffer, and a packet transmitting process is performed in step S15.

When it is determined in step S12 that a multicast packet is to be output, the address in the packet buffer, i.e., the address at which the data of a multicast packet is written, is obtained from the relevant multicast management table in step S16. In step S17, the packet data is read from the packet buffer. In step S18, the packet transmitting process is performed. After the packet transmitting process is performed in step S15 or S18, the processes in steps S10 and S11 are performed in parallel. For example, a packet type can be determined in step S4 after writing the packet data in step S3, or the process in step S11 can be performed after the process in step S10 shown in FIG. 6. However, in this example, the parallel processing is performed for high speed processing.

Figure 7:
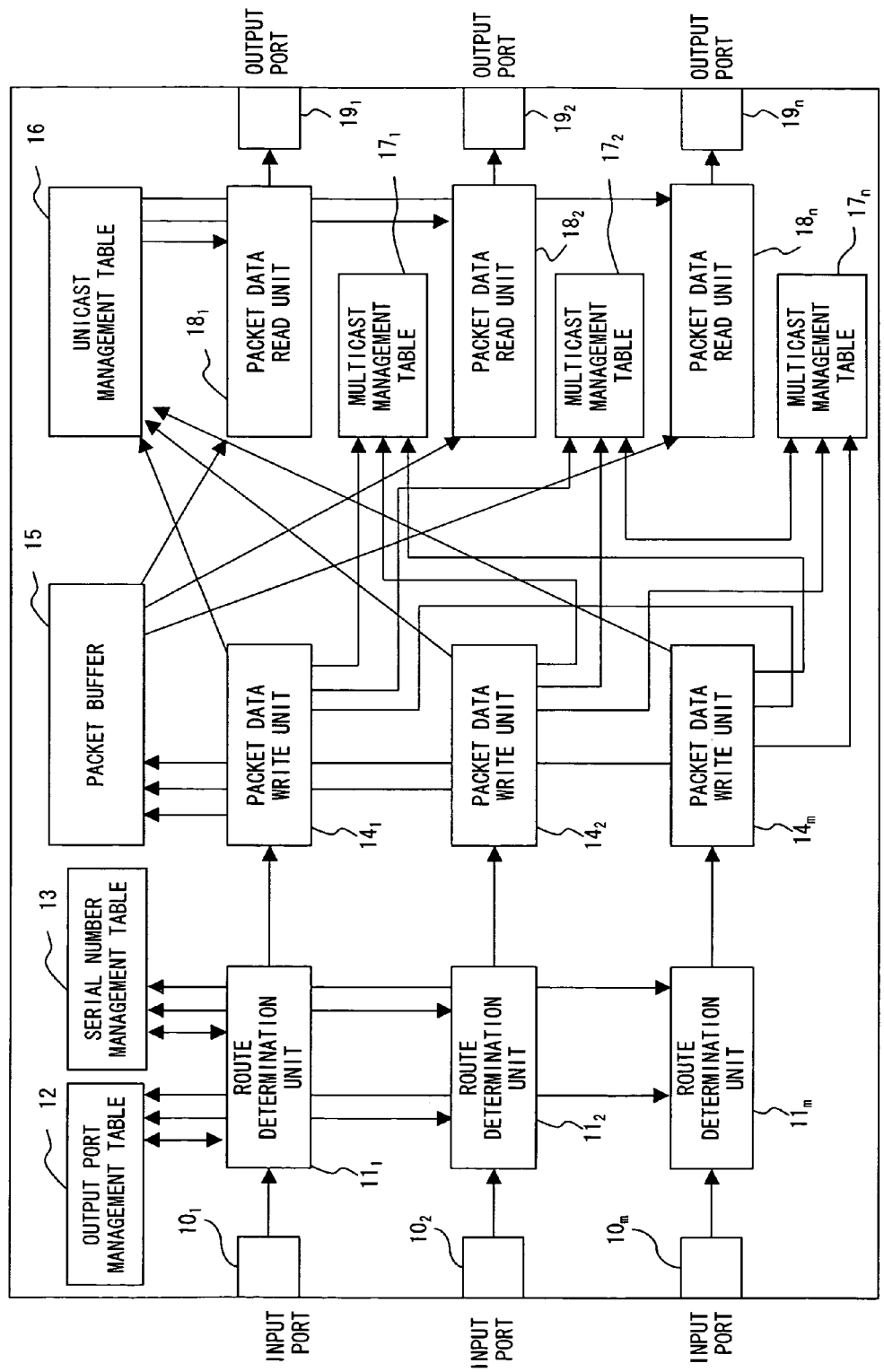
FIG. 7 is a block diagram of the configuration of the packet transfer path control apparatus according to the first embodiment of the present invention.

Described below in detail is the first embodiment of the present invention. FIG. 7 is a block diagram of the configuration of the packet transfer path control apparatus according to the first embodiment of the present invention. In FIG. 7, as in the conventional technology shown in FIG. 2, route determination units 111 through 11m are provided for respective input ports 101 through 10m, and each route determination unit can access an output port management table 12. Additionally, a serial number management table 13 which does not exist in the conventional technology is provided and accessible by each route determination unit. According to the first embodiment, the serial number management table 13 manages the order of the output of a packet. The details are described later.

Furthermore, packet data write unit 141 through 14m are provided for each route determination unit. Also provided are a packet buffer 15 and a unicast management table 16 storing the management information about a unicast packet in place of the packet management table 55 in the conventional technology.

Multicast management tables 171 through 17n storing the management information about a multicast packet are provided respectively corresponding to packet data read units 181 through 18n corresponding to output ports 191 through 19n respectively. The management information is written from the packet data write unit to the unicast management table 16, and the management information is read by each packet data read unit corresponding to the output of a unicast packet.

In FIG. 7, the route determination unit 111 determines the packet type, i.e., a unicast packet or a multicast/broadcast packet, of a packet input from any input, for example, the input port 101 and an output port through which the packet is to be output, and a serial number is assigned to the packet. In determining the packet type, for example, in the case of an Ethernet frame, a unicast packet is determined when the value of the leading bit of the destination address is 0, and a multicast packet is determined when it is 1. The output port is determined depending on the contents of the output port management table 12.

Figure 8:
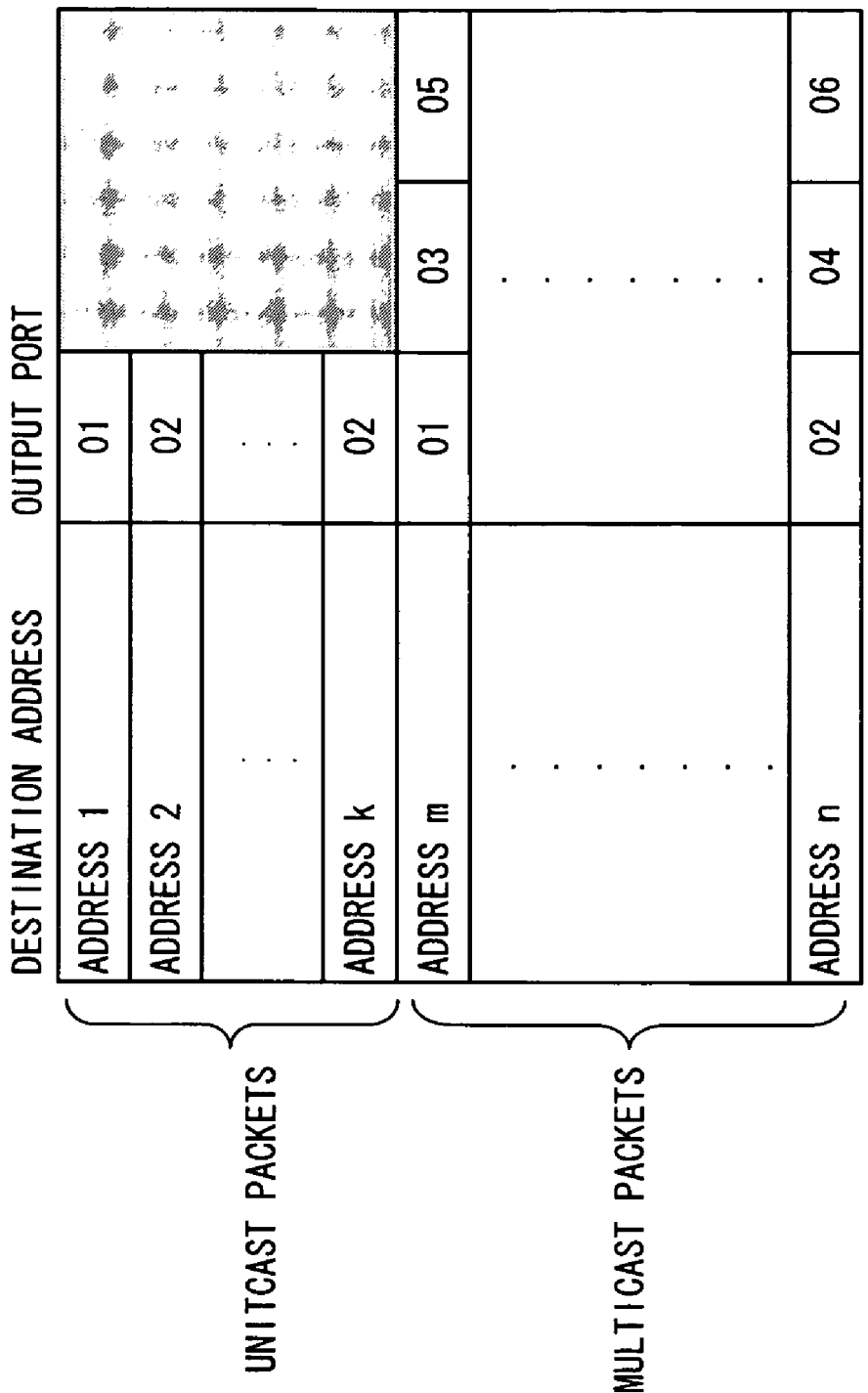
FIG. 8 shows an example of the contents stored in the output port management table.

FIG. 8 shows an example of the contents stored in the output port management table. In FIG. 8, the number of an output port is stored corresponding to each destination address of a packet. For a unicast packet, one output port number is stored for each destination address. For a multicast packet, a plurality of output port numbers are stored for each address. The contents of the table is predetermined in operating a network by, for example, a carrier, and an output port through which a packet is to be output can be determined by referring to a destination address. Furthermore, according to two pieces of information about the transmitter address of an input packet and an input port, the contents can also be set through self-learning, but the detailed explanation of it is omitted here.

Then, the contents of the serial number management table 13 are referred to by the route determination unit 111, and the serial number is assigned to the input packet. The serial number is managed in the entire apparatus, or managed for each output port. FIG. 9 shows an example of a storage format in the serial number management table 13 when the number is managed for each output port. Each time a packet is input, a serial number is read corresponding to the output port through which the packet is to be output, the number is assigned to the input packet, the serial number is incremented by 1, and it is stored in the table. In this process, the information about the packet type, the output port number, and the serial number is transmitted together with the packet data to, for example, the packet data write unit 141.

The packet data write unit 141 writes the packet data to the packet buffer 15, the storage address of the packet data in the packet buffer, the packet length, the serial number, etc. are written to the unicast management table 16, or the multicast management table corresponding to the output port through which the packet is output as a multicast packet. In the apparatus, for each output port, a queue storing the management information about a unicast packet is used as the unicast management table 16, and a queue storing the management information about a multicast/broadcast packet is configured for each output port and used as a multicast management table.

Figure 10:
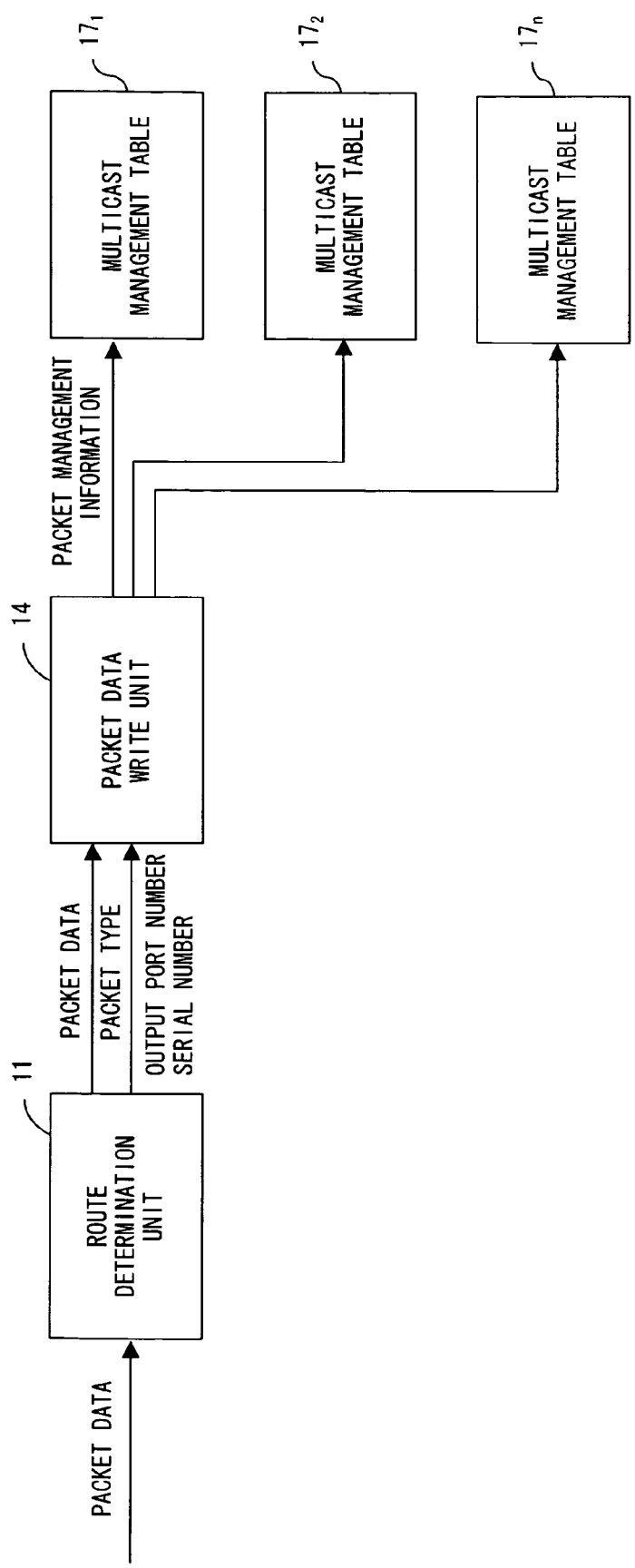
FIG. 10 is an explanatory view of the system of writing the packet management information in the multicast management table.

FIG. 10 is an explanatory view of the system of writing the packet management information to the multicast management table when an input packet is a multicast packet. As shown in FIG. 10, packet data, a packet type, an output port number, and a serial number are provided from the route determination unit 11 to the packet data write unit 14. When the packet is a multicast packet, the packet data write unit 14 writes the multicast packet management information to each of the multicast management tables corresponding to the output ports through which the packet is to be output. Thus, the packet management information can be written in parallel to the multicast management table corresponding to all output ports through which the packet determined by the route determination unit 11 is to be output.

As described above, when the packet is a unicast packet, the management information is written to the unicast management table 16. FIG. 11 shows an example of the configuration of the unicast management table according to the first embodiment of the present invention. The unicast management table 16 corresponds to the queue for each output port as described above, is used with the three tables, i.e., a leading packet management table, a trailing packet management table, and a vacant area management table, and is used in managing a unicast packet. The leading packet management table stores for each output port the number of packets in a transmission wait status and, as a pointer, the address in the unicast management table of the management data of the leading packet to be output next. Similarly, the trailing packet management table stores for each output port the address of the packet management information about the last packet in the order in a transmission wait status as a pointer.

The unicast management table stores four pieces of information in each entry, i.e., the storage address in the packet buffer of the packet data corresponding to the management information, the packet length, the serial number, and the pointer to the management information about the packet to be output next through the same output port. Since packet data can be stored at a plurality of addresses in the packet buffer, the packet length is stored for the management of such a packet. The vacant area management table stores a pointer to each of space areas in the unicast management table, i.e., the areas in which no data is stored.

Figure 12:
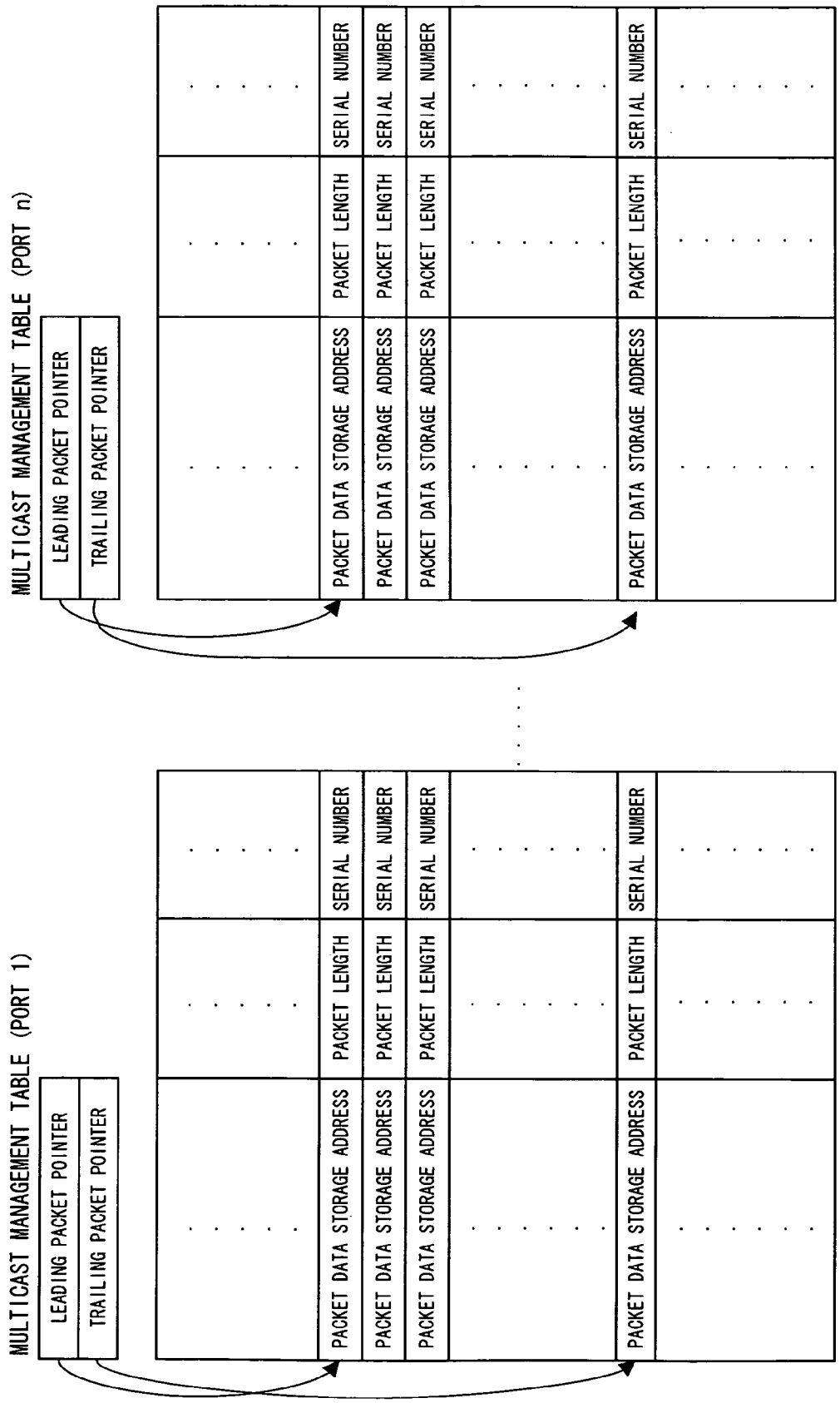
FIG. 12 shows an example of the configuration of the multicast management table according to the first embodiment of the present invention.

FIG. 12 shows an example of the configuration of the multicast management table according to the first embodiment of the present invention. As explained above by referring to FIG. 7, the multicast management table is provided one to one for each output port. A multicast management table constitutes a queue for each output port, and is managed with a pointer to the leading packet in the queue, i.e., the pointer to the leading packet indicating the address at which the management information about a packet to be output first is stored, and with a trailing packet pointer indicating the address of the management information about the packet to be output last. As the packet management information, the storage address of the packet data in the packet buffer, the packet length, and the serial number are stored as in the unicast management table. When the management information is added to a queue, the management information is stored at the address next to the address pointed to by the trailing packet pointer, and the trailing packet pointer is incremented. When a packet is output, the management information about the address pointed to by the leading packet pointer is read, and the value of the leading packet pointer is incremented, thereby updating the table. Since the management information is stored in the order of the addresses, the output order of the multicast packets can be guaranteed. The unicast packets can be managed not in the arrangement shown in FIG. 11, but in the table arrangement individually for each output port as shown in FIG. 12.

Figure 13:
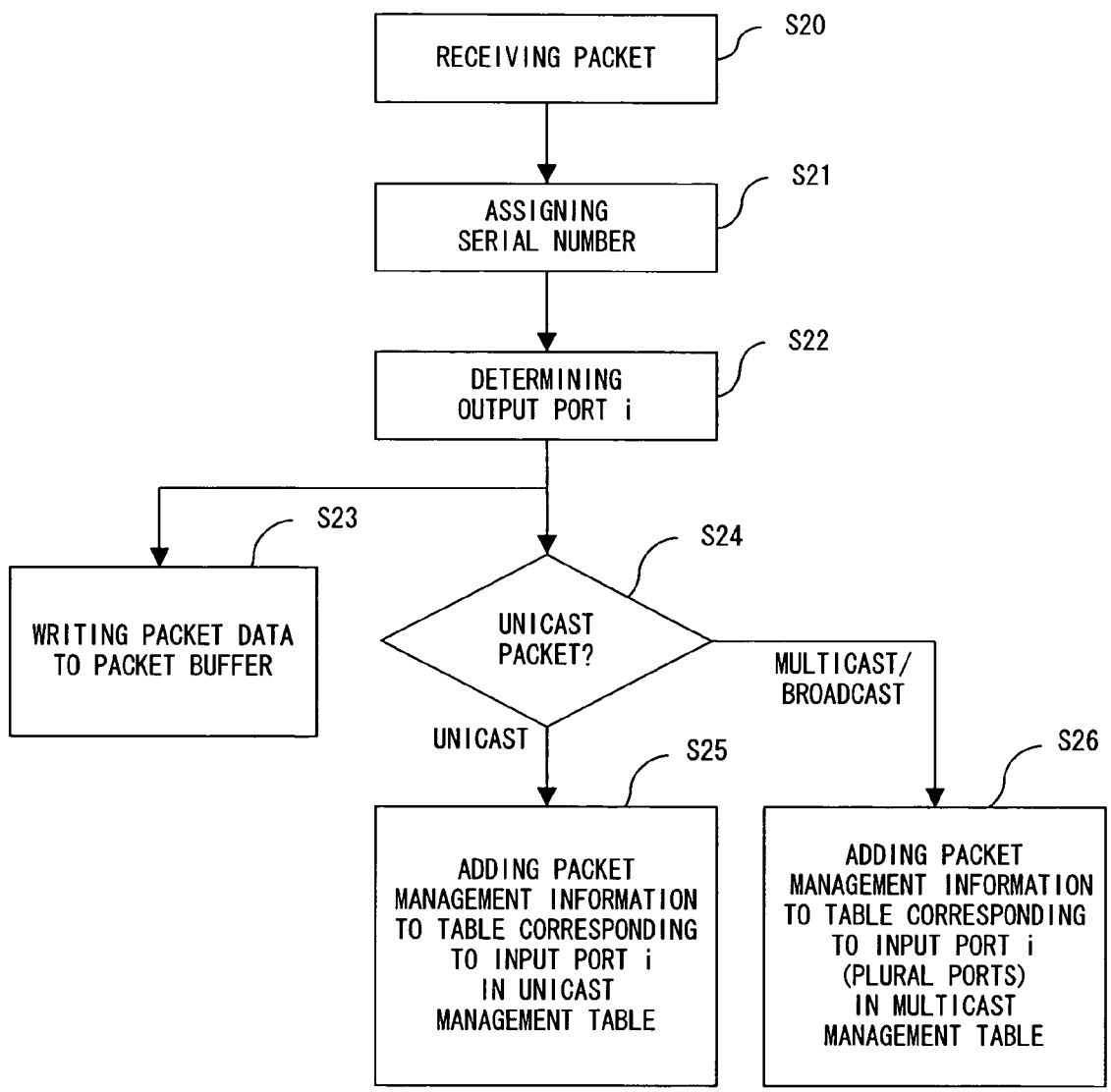
FIG. 13 is a flowchart of the process performed when a packet is received according to the first embodiment of the present invention.

FIG. 13 is a flowchart of the process performed when a packet is received according to the first embodiment of the present invention. The process shown in FIG. 13 is similar to that of the basic process shown in FIG. 5. When a packet is received in step S20, a serial number is assigned in step S21, an output port is determined in step S22, and the process similar to that shown in FIG. 5 is performed. That is, in step S25, the management information about a packet is added to the queue corresponding to the output port i of the unicast management table. In step S26, the management information about the packet is stored in the multicast packet management table corresponding to each of the output ports through which the input multicast packet is to be output.

Figure 14:
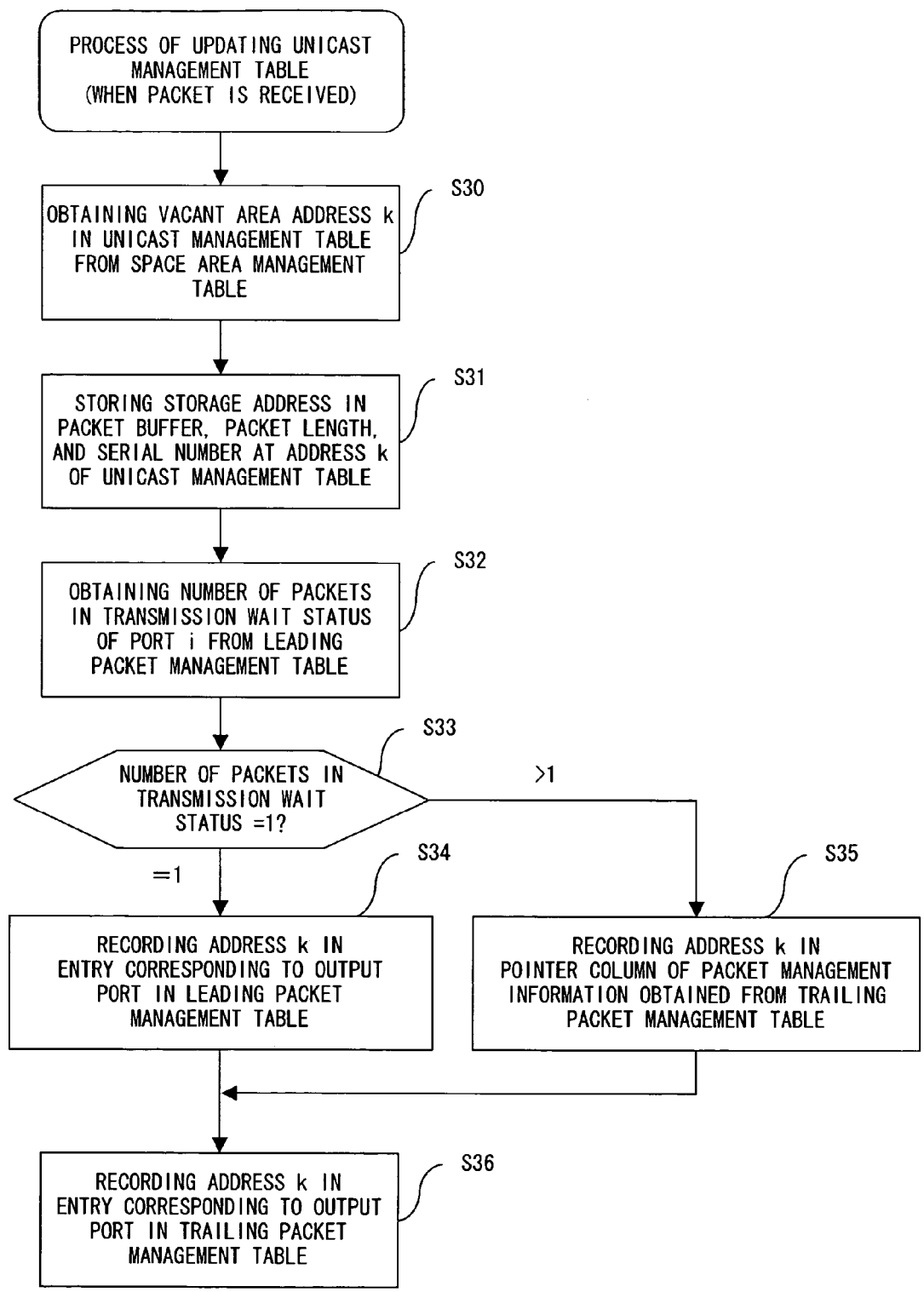
FIG. 14 is a flowchart of the process of updating the unicast management table when a packet is received.

FIG. 14 is a flowchart of the process of updating the unicast management table when a packet is received. In FIG. 14, first in step S30, a vacant area address k is obtained by the pointer to one vacant area in the unicast management table from the vacant area management table. The pointer can be basically any pointer in the vacant area management table. In step S31, the storage address in the packet buffer of the received packet data, the packet length, and the serial number are stored at the address k in the unicast management table. In step S32, the number of packets in a transmission wait status of the output port i through which a unicast packet is to be output is obtained from the leading packet management table, and a value incremented by 1 is written.

In step S33, it is determined whether or not the number of packets in a transmission wait status is 1. If it is 1, the address k is recorded as a pointer in the entry corresponding to the output port i of the leading packet management table in step S34 to create a new queue corresponding to the output port i. If the number of packets in a transmission wait status is larger than 1, i.e., 2 or larger, then the pointer to the trailing packet corresponding to the output port i is obtained from the trailing packet management table, and the address k is recorded as the value of the pointer in the management information stored at the address in the unicast management table pointed to by the trailing packet pointer to add the management information about the packet to the corresponding queue in step S35. Then, control is passed to step S36. In step S36, the address k is recorded as the pointer corresponding to the output port i of the trailing packet management table, thereby terminating the process.

Figure 15:
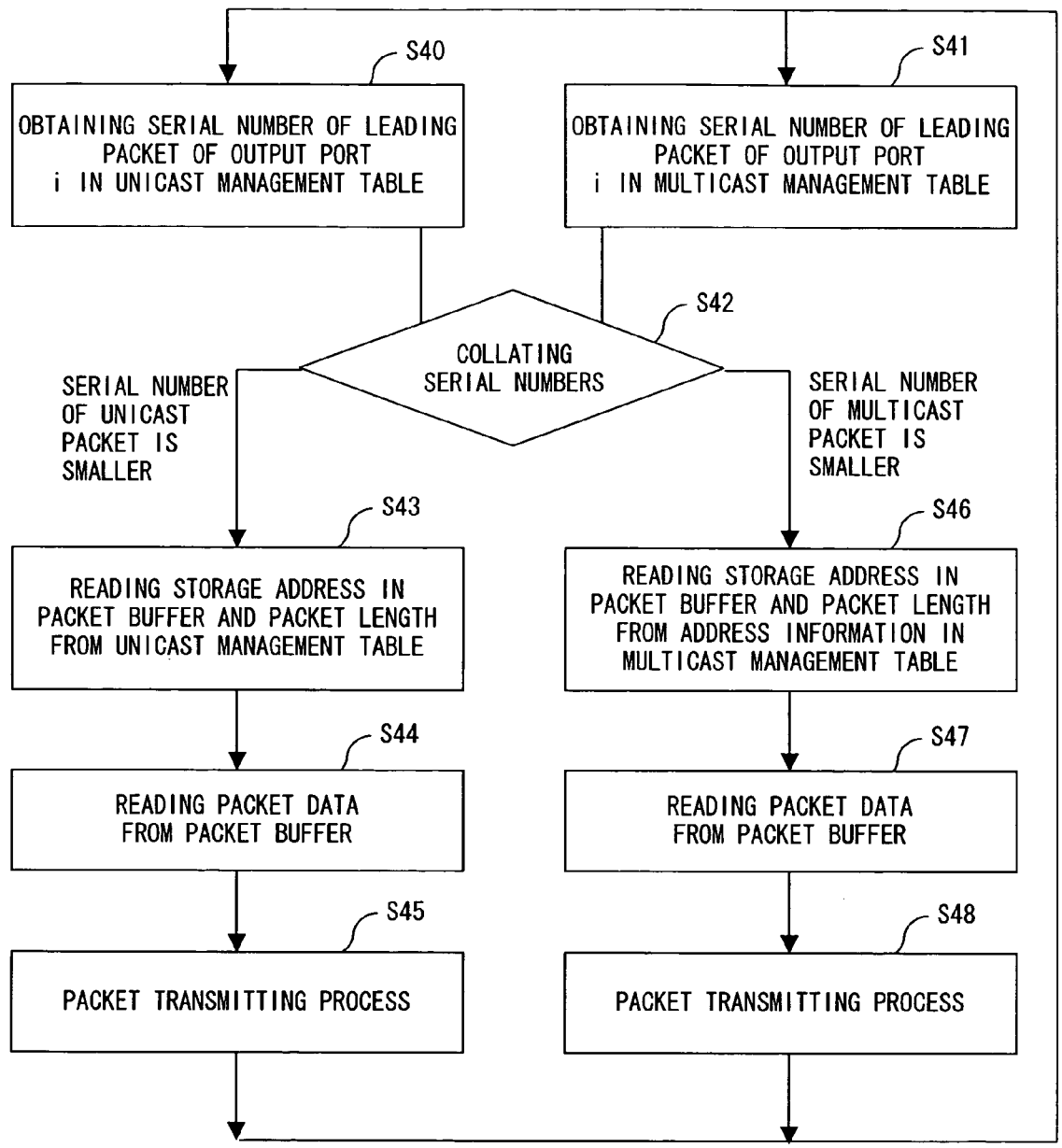
FIG. 15 is a flowchart of the process performed when a packet is transmitted according to the first embodiment of the present invention.

FIG. 15 is a flowchart of the process performed when a packet is transmitted. FIG. 15 is similar to the flowchart of the basic process shown in FIG. 6. First, in steps S40 and S41, the serial number of the leading packet to be output next from each management table is obtained. In step S42, the numbers are compared. If the serial number of the unicast packet is smaller, the processes in steps S43 through S45 are performed to transmit the unicast packet. If the serial number of the multicast packet is smaller, the processes in steps S46 through S48 are performed to transmit the multicast packet.

Figure 16:
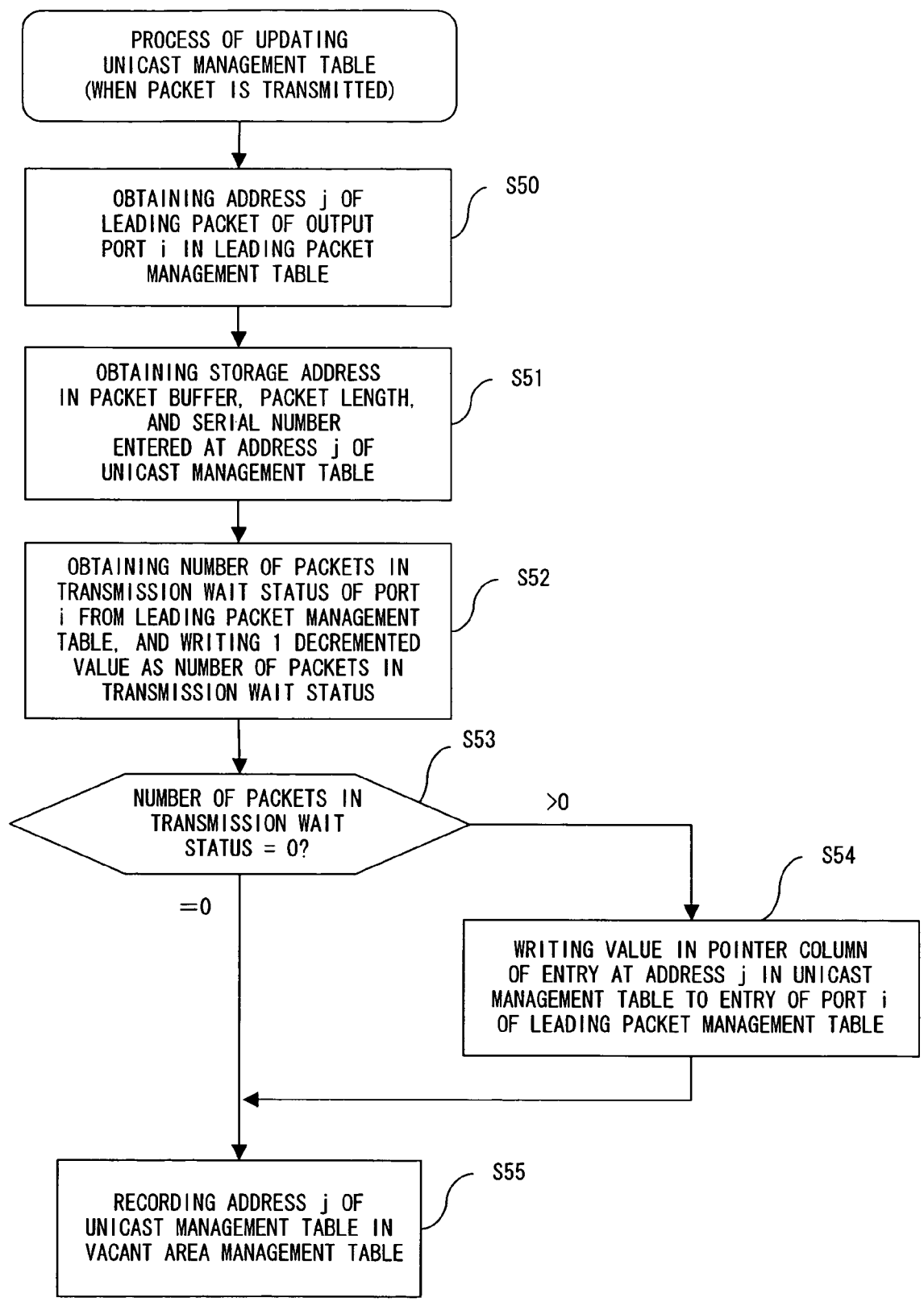
FIG. 16 is a flowchart of the process of updating the unicast management table when a packet is transmitted.

FIG. 16 is a flowchart of the process of updating the unicast management table when a packet is transmitted according to the first embodiment of the present invention. When a unicast packet is transmitted from the output port i, the packet data read unit corresponding to the output port updates the contents stored in the unicast management table 16. First, in step S50, the address j pointed to by the leading packet pointer is obtained from the entry corresponding to the output port i of the leading packet management table. In step S51, the packet data storage address, the packet length, and the serial number stored at the address j of the unicast management table are read. In step S52, the number of packets in a transmission wait status in the output port i is read from the leading packet management table, and a decremented version of the read value is written as the number of packets in a transmission wait status.

In step S53, it is determined whether or not the new number of packets in a transmission wait status is 0. If it exceeds 0, that is, if it is 1 or larger, then in step S54 the value of the pointer stored in the entry at the address j of the unicast management table is written to the entry corresponding to the output port i of the leading packet management table. Then, in step S55, the address j of the unicast management table is recorded in the vacant area management table, thereby terminating the process. If the number of packets in a transmission wait status is 0, then control is directly passed to step S55.

As described above by referring to FIG. 12, since the multicast management table is provided for each output port, and the management information about packets is stored such that the input order is associated with the address order, it is easy to update the table when a packet is transmitted and received. That is, data can be updated only by updating the leading packet pointer or the trailing packet pointer when the management information in the multicast management table is added or deleted.

In the above-mentioned first embodiment, the processes of adding a serial number to an input packet, managing the number, and comparing the serial numbers between the unicast packet and the multicast packet when a packet is to be transmitted are required in addition to the processes in the conventional technology. However, these processes are simple, and have a larger effect of guaranteeing the output order of packets between a unicast packet and a multicast packet in addition to between unicast packets and between multicast packets.

Figure 17:
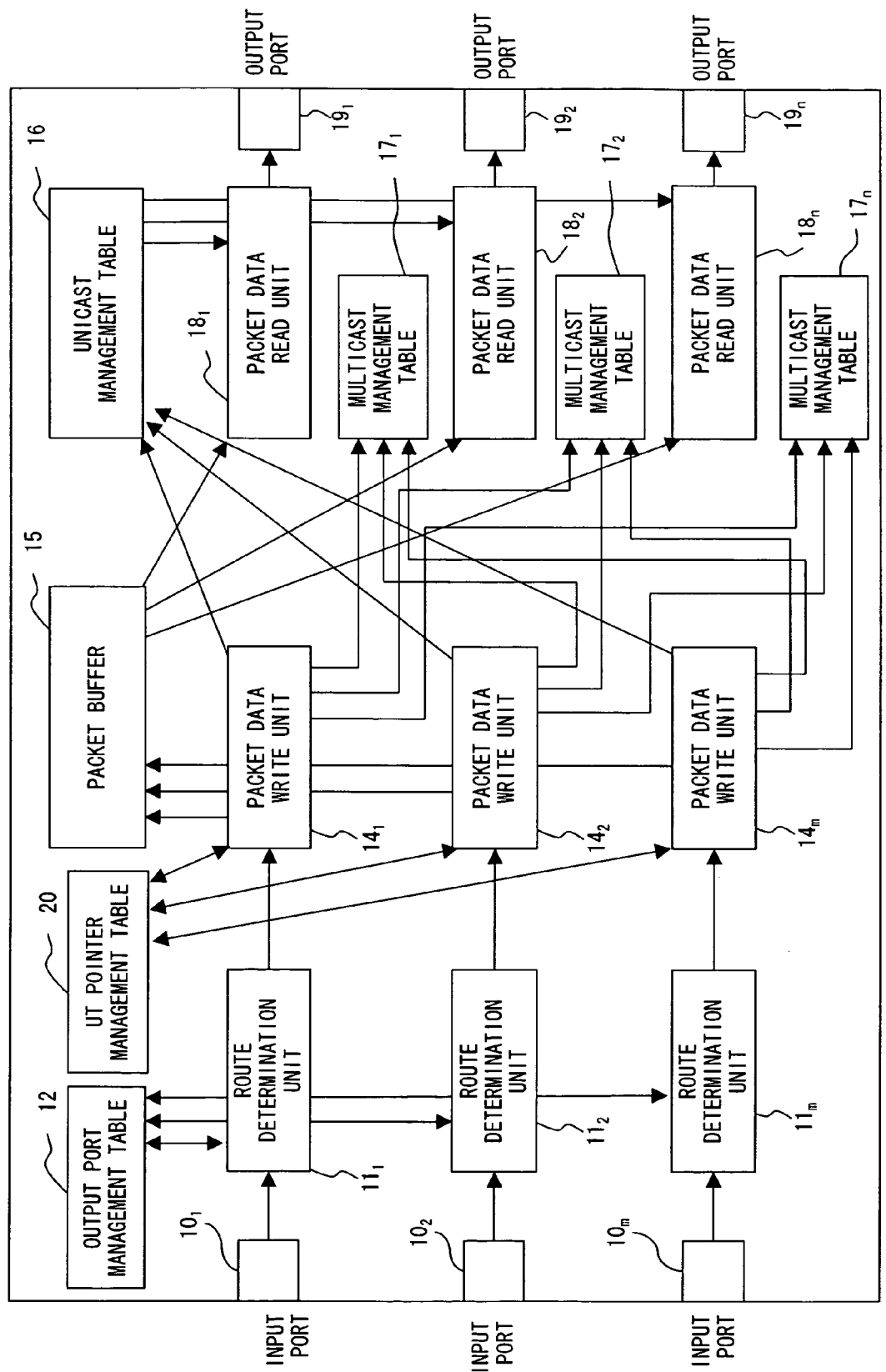
FIG. 17 is a block diagram of the configuration of the packet transfer path control apparatus according to the second embodiment of the present invention.

Described below is the second embodiment of the present invention. FIG. 17 is a block diagram of the configuration of the packet transfer path control apparatus according to the second 51 embodiment of the present invention. When FIG. 17 is compared with FIG. 7 showing the first embodiment of the present invention, the serial number management table 13 is replaced with a UT pointer management table 20. The UT pointer management table 20 is accessed by each packet data write unit, not by the route determination unit as in the first embodiment.

That is, in the second embodiment, the output order of packets is managed using the UT pointer replacing the serial number. FIG. 18 shows the storage format in the UT pointer management table 20. The value of a UT pointer is stored for each output port.

Each time a unicast packet is input from each input port, the packet data write unit corresponding to the input port stores as the value of the UT pointer the address of the unicast management table 16 storing the management information about the packet in the entry corresponding to the output port through which the packet is to be output. That is, the UT pointer management table 20 stores for each output port the address of the unicast management table of the management information corresponding to a last input one of the unicast packets which are to be output from the output port. As the value of the UT pointer, the address of the unicast management table can be replaced with the address in the packet buffer storing the data of the unicast packet.

Figure 19:
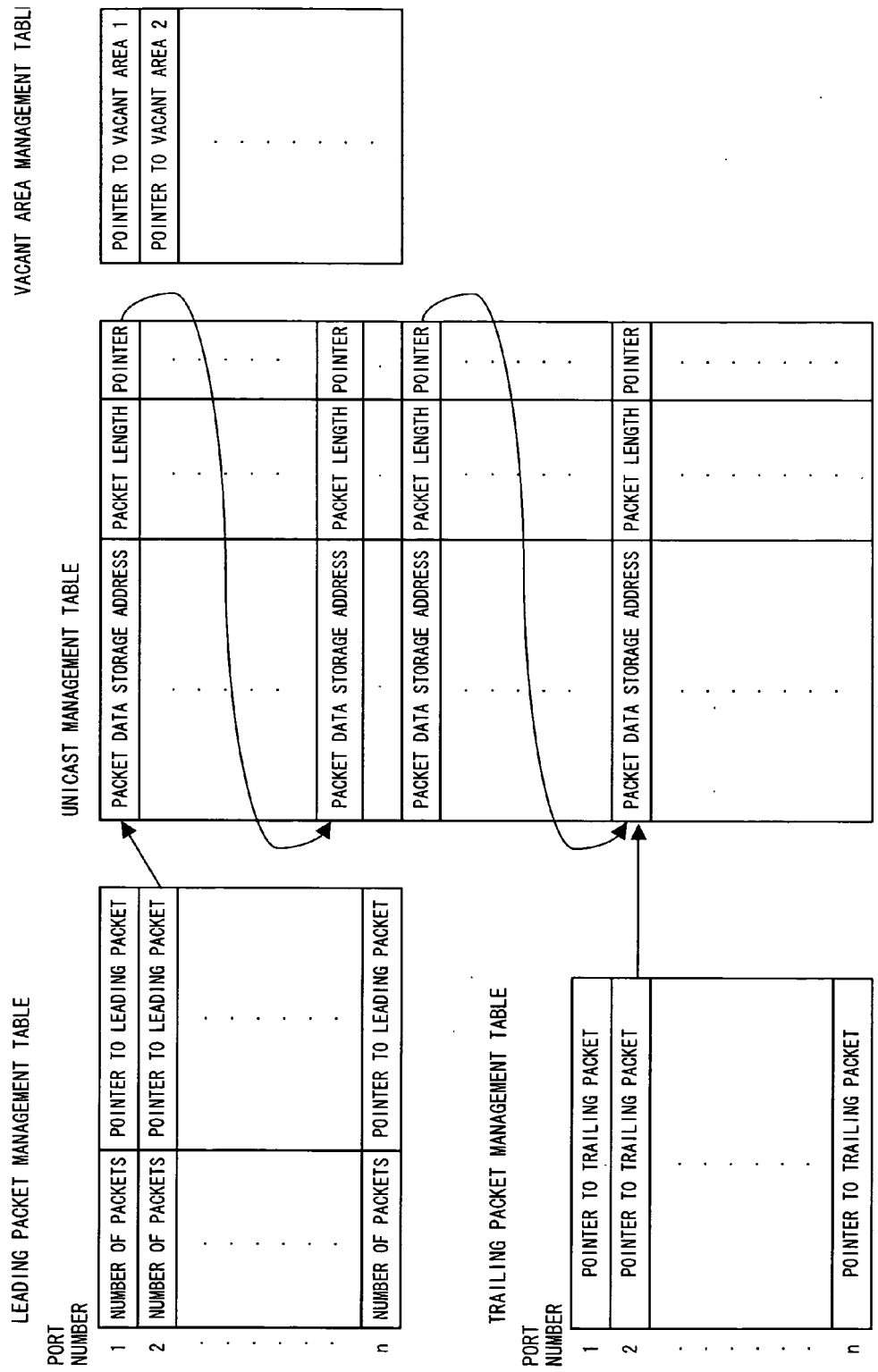
FIG. 19 shows an example of the configuration of the unicast management table according to the second embodiment of the present invention.

FIG. 19 shows the configuration of the unicast management table according to the second embodiment of the present invention. When FIG. 19 is compared FIG. 11 showing the first embodiment, the configurations are almost the same as each other except that each entry of the unicast management table does not store a serial number in the second embodiment. The procedure of updating the unicast management table in the second embodiment is also similar to the procedure in the first embodiment except that no serial numbers are used.

Figure 20:
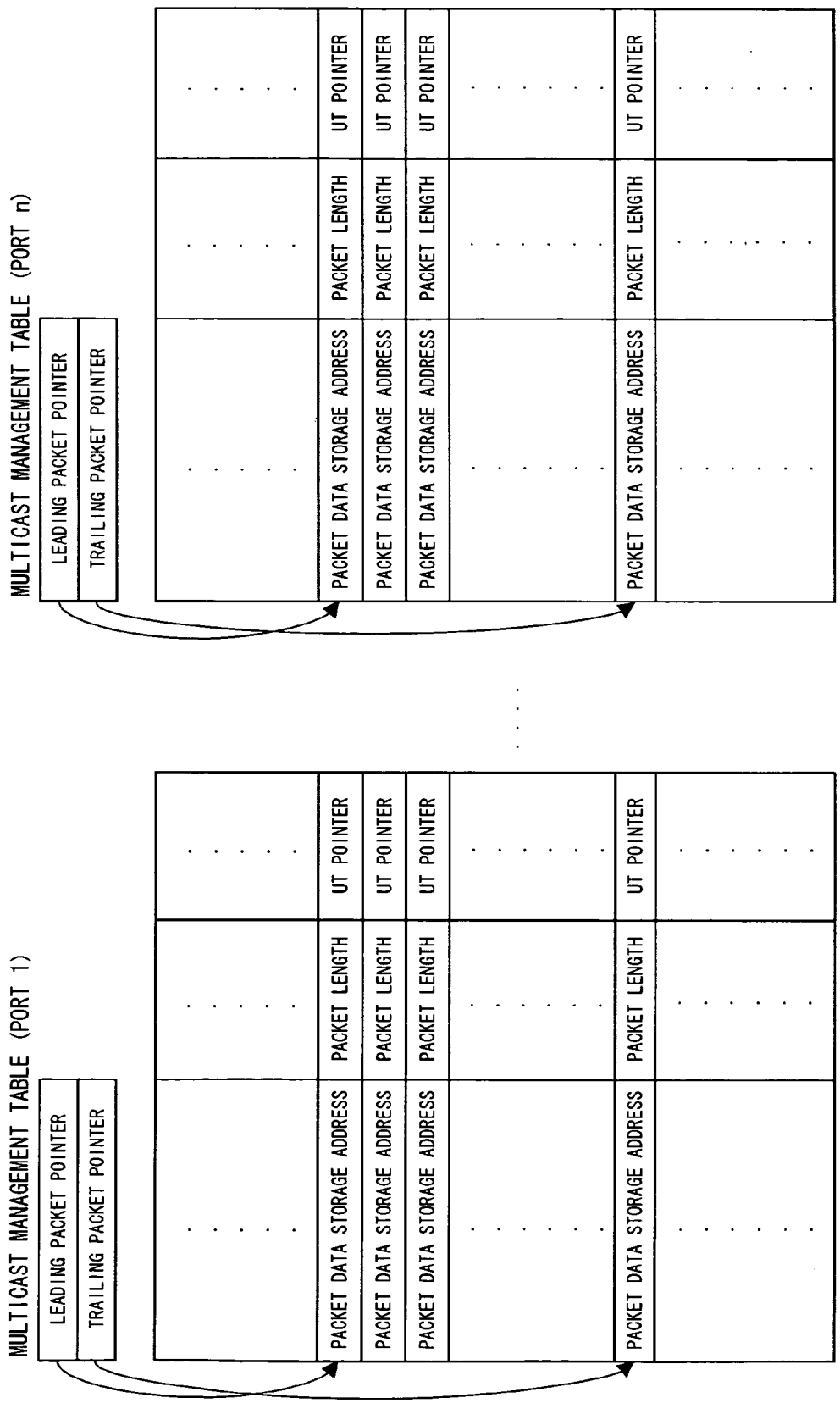
FIG. 20 shows an example of the configuration of the multicast management table according to the second embodiment of the present invention.

FIG. 20 shows the configuration of the multicast management table according to the second embodiment of the present invention. When FIG. 20 is compared with FIG. 12 showing the first embodiment, it is only different in that the serial number is replaced with the UT pointer.

In the second embodiment, when a packet input from an input port is a multicast packet to be output from a plurality of output ports, the corresponding packet data write units read respective UT pointers stored in the UT pointer management table 20, i.e., the value of the pointer corresponding to the last input unicast packet for each of the output ports through which the input packet is to be output; and each of the read values is stored as the value of the UT pointer shown in FIG. 20 together with the storage address of the packet data in the packet buffer and the packet length in a corresponding multicast management table. The procedure of updating the management information when a packet is received and when a packet is transmitted in the multicast management table is performed as a simple process as in the first embodiment except the process of the UT pointer.

Figure 21:
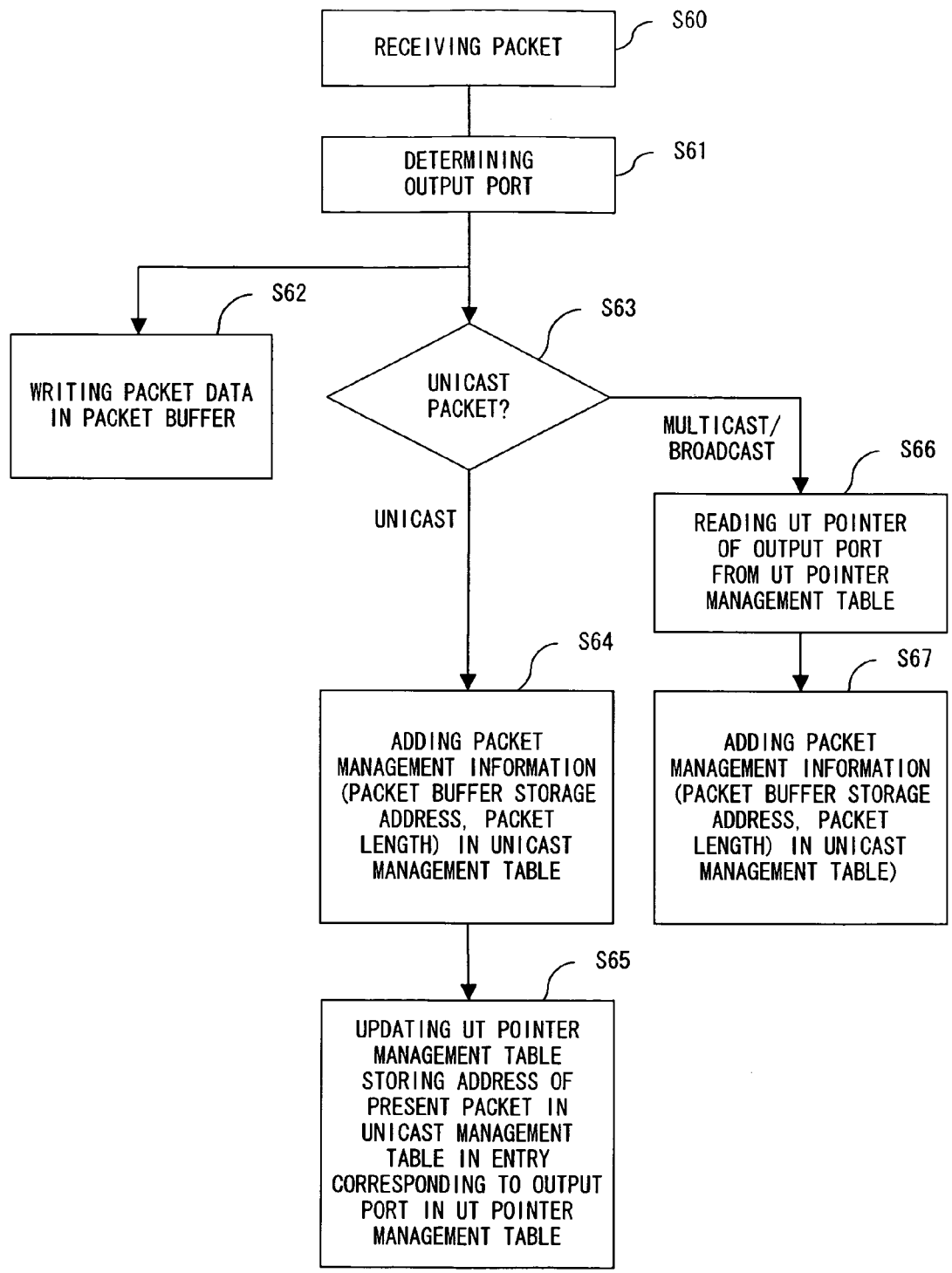
FIG. 21 is a flowchart of the process performed when a packet is received according to the second embodiment of the present invention.

FIG. 21 is a flowchart of the process performed when a packet is received according to the second embodiment of the present invention. As in the flowchart of the basic process shown in FIG. 5, the processes in steps S60 through S63 are performed. If it is determined in step S63 that the received packet is a unicast packet, the packet management information is added to the unicast management table in step S64, and then the value of the pointer stored in the UT pointer management table is updated in step S65. That is, in the UT pointer management table, the address in the unicast management table storing the management information about the packet is stored in the entry corresponding to the output port through which the unicast packet is to be output. If it is determined in step S63 that the packet is a multicast packet, then the value of the UT pointer is read from the UT pointer management table in step S66, and the packet management information including the value of the UT pointer is added to the multicast management table in step S67.

FIG. 22 is a flowchart of the process performed when a packet is transmitted from an output port according to the second embodiment of the present invention. In the second embodiment, the packet data read unit corresponding to the output port retains the address in the unicast management table of the management information about the last output unicast packet from the output port, and the process of outputting a packet is performed according to the flowchart of the packet transmitting process shown in FIG. 22. First, in step S70, the UT pointer of the leading packet in the multicast management table corresponding to the output port i is obtained. In step S71, the value of the pointer is compared with the address of the management information in the unicast management table of the last input. If this value is equal, then it is clear that the unicast packet input immediately before the multicast packet corresponding to the just read UT pointer value has already been output from the output port i. Therefore, it is determine that a multicast packet is transmitted as a packet to be transmitted next, and a process of transmitting a multicast packet is performed in steps S76 through S78.

If the value of the UT pointer is not equal to the stored address of the unicast management table, then it is determined that there is still a unicast packet to be output before the multicast packet corresponding to the UT pointer just read, and the unicast packet is transmitted in steps S72 through S74. Then, in step S75, the address of the unicast management information storing the packet management information corresponding to the transmitted unicast packet is stored in step S75, and control is returned to step S70.

Although a unicast packet is to be transmitted if the value of the UT pointer is not equal to the stored value of the address in step S 71, it is common that the stored address is smaller than the value of the UT pointer, and it is assumed that there is a unicast packet to be output before outputting a multicast packet. However, for example, since the address at which the management information about the packet in the unicast management table shown in FIG. 19 configures a queue for each output port, the address at which the management information is stored earlier is not necessarily smaller than the address at which the management information is stored later. Therefore, when the value of the UT pointer is not equal to the stored address, a unicast packet is transmitted.

Thus, in the second embodiment, the value of the UT pointer corresponding to a multicast packet is compared with the address of the unicast management table of the packet management information corresponding to the last out unicast packet which address is retained in the packet data read unit, and it is determined which is to be output next, a unicast packet or a multicast packet. Thus, the order of the output packets can be guaranteed between a unicast packet and a multicast packet. For the guarantee, the process of managing the UT pointer and comparing the value of the pointer when a packet is transmitted with the packet management information address are added to the conventional processes. However, these processes are simple, and have a larger effect of guaranteeing the output order of packets between a unicast packet and a multicast packet in addition to between unicast packets, and between multicast packets.

According to the present invention, the process of transferring a packet including a multicast packet can be performed at a high speed by managing the output of a multicast packet using the contents stored in a multicast management table provided one to one for output ports.

Furthermore, according to the present invention, the output order of the packets can be guaranteed by assigning a serial number to each input packet or using a UT pointer to a last input one of the unicast packets to be output from each of the output ports, thereby successfully guaranteeing the output order between unicast packets and multicast packets.

The present invention can be applied not only to the communications industries in which packets are used in communications but also to all industries requiring in-house communications over a private network.

What is claimed is:

1. A packet transfer path control apparatus which controls a transfer of a unicast packet and a multicast packet, comprising:

an output port determination unit determining an output port through which a packet input from any of one or more input ports is to be output, and assigning output order identification information for designation of an output order of the packet, the output order of the packet indicating an input order of the packet among a plurality of input packets including both the unicast packet and the multicast packet and indicating whether the unicast packet arrives earlier than the multicast packet;

a packet data storage unit storing data of the plurality of input packets; and a plurality of packet output units respectively corresponding to the plurality of output ports, each packet output unit reading data of a packet determined by said output port determination unit to be output through a corresponding output port associated with the packet output unit in an output order indicated by the output order identification information from said packet data storage unit, and outputting the read data through the corresponding output port, wherein said output order identification information is a serial number indicating input orders of all packets input through all input ports, or a serial number indicating input orders of all packets output through each output port.

2. The apparatus according to claim 1, further comprising:

a unicast packet management information storage unit storing for each output port management information including a storage position in said packet data storage unit of the data of each unicast packet to be output through the output port and output order identification information for the unicast packet; and a multicast packet management information storage unit provided for each output port and storing, for each of the multicast packets to be output through the output port, management information including a storage position in said packet data storage unit of the data of the multicast packet and output order identification information of the multicast packet.

3. The apparatus according to claim 2, wherein said packet output unit for each output port compares output order identification information about a next output unicast candidate of packets whose packet management information is stored in said unicast packet management information storage unit with output order identification information about a next output multicast candidate of packets whose packet management information is stored in said multicast packet management information storage unit, and determining a packet to be output next from the output port.

4. A packet transfer path control apparatus which controls a transfer of a unicast packet and a multicast packet, comprising:

an output port determination unit determining an output port through which a packet input from any of one or more input ports is to be output;

a pointer storage unit storing for each output port a pointer to a location where there is stored data of a last input one of the unicast packets to be output through the output port or packet management data for the last input unicast packet;

a packet data storage unit storing data of a plurality of input packets including both the unicast packet and the multicast packet;

a packet output unit provided for each output port, reading data of a packet determined by said output port determination unit to be output through the output port in an output order for guarantee of an input/output order of the unicast packet and the multicast packet based on stored contents of said pointer storage unit from said packet data storage unit, the output order indicating an input order of the packet among the plurality of input packets and indicating whether the unicast packet arrives earlier than the multicast packet, and outputting the read data through the output port.

5. The apparatus according to claim 4, further comprising:

a unicast packet management information storage unit storing for each output port packet management information including a storage position in said packet data storage unit for data of each unicast packet to be output through the output port; and a multicast packet management information storage unit provided for each output port and storing packet management information including a storage position in said packet data storage unit for data of each multicast packet to be output through the output port, and a value of a pointer read corresponding to the output port from said pointer storage unit when the multicast packet is input.

6. The apparatus according to claim 5, wherein said pointer points to the storage position in said packet data storage unit for data of a last input unicast packet, or a storage position of packet management information corresponding to the unicast packet in said unicast packet management information storage unit.

7. The apparatus according to claim 6, wherein said packet output unit for each output port storing the storage position in said unicast packet management information storage unit of packet management information for the unicast packet output immediately before from the output port, comparing, when a next packet is to be output through the output port, the value of the pointer to a next output candidate of multicast packets whose packet management information is stored in said multicast packet management information storage unit with the storage position, and outputting a multicast packet when the value match the storage position or outputting a unicast packet when the value does not match the storage position.

8. A computer-readable recording medium having recorded thereon a computer-executable program, the program used to direct a computer to control a transfer of a unicast packet and a multicast packet, comprising:

a procedure of determining one of output ports through which one a packet input through an input port is to be output;

a procedure of, if the input packet is the unicast packet to be output through the one output port, writing, for the one output port, order identification information assigned for the unicast packet in a table storing for each output port the management information about each unicast packet to be output thorough the output port, the order identification information being assigned to all packets to be output through all of the output ports or all packets to be output through each output port in an input order; and a procedure of, if the input packet is the multicast packet to be output through the one output port, writing order identification information assigned for the multicast packet in a table provided for the one output port and storing the management information about each multicast packet to be output through the one output port, the order identification information being assigned to all packets to be output through all of the output ports or all packets to be output through each output port in an input order;

wherein an output order of the packet indicates the input order of the packet among a plurality of input packets including both the unicast packet and the multicast packet and indicates whether the unicast packet arrives earlier than the multicast packet, and the order identification information is a serial number indicating input orders of all packets input through all input ports, or a serial number indicating input orders of all packets output through each output port.

9. The computer-readable recording medium according to claim 8, wherein the program further comprises:

a procedure of reading order identification information about the unicast packet to be output next from a table storing unicast packet management information corresponding to an output port, and reading order identification information about the multicast packet to be output next from a table storing multicast packet management information; and a procedure of comparing the two read values of order identification information, and determining which packet is to be output next through the output port, the unicast packet or the multicast packet.

10. A computer-readable recording medium having recorded thereon a computer-executable program, the program used to direct a computer to control a transfer of a unicast packet and a multicast packet, comprising:

a procedure of determining one of a plurality of output ports through which a packet input through an input port is to be output;

a procedure of, when the input packet is the unicast packet, storing for the one output port a storage address in a table storing management information about the input packet or a storage address in a table storing data of plurality of input packets including both the unicast packet and the multicast packet; and a procedure of, when the packet is the multicast packet, writing in a table storing management information about the multicast packet for each output port through which the packet is to be output a storage address in a table storing management information about the unicast packet stored corresponding to the one output port or a storage address in a table storing the data of the packet;

wherein an output order of the packet indicates the input order of the packet among the plurality of input packets and indicates whether the unicast packet arrives earlier than the multicast packet.

11. The computer-readable recording medium according to claim 10, wherein the program further comprises:

a procedure of reading a storage address in a table storing management information about the unicast packet corresponding to the multicast packet to be next output, or a storage address in a table storing data of the unicast packet from a table storing management information about a multicast packet for each output port;

a procedure of comparing the read storage address in a table storing management information about the unicast packet or a storage address in a table storing data of the unicast packet with a storage address in a table storing management information about the last output unicast packet or the storage address in a table storing the data of the packet, and determining which is to be output from the output port, the unicast packet or the multicast packet; and a procedure of, when the unicast packet is output, storing a storage address in a table storing management information about the unicast packet to be output or a storage address in a table storing data of the packet.

12. A packet transfer path control apparatus which controls a transfer of a unicast packet and a multicast packet, comprising:

output port determination means for determining an output port through which a packet input from any of one or more input ports is to be output, and assigning output order identification information for designation of an output order of the packet;

packet data storage means for storing data of a plurality of input packets including both the unicast packet and the multicast packet; and packet output means provided for each of a plurality of output ports for reading data of a packet determined by said output port determination unit to be output through the output port in an output order indicated by the output order identification information from said packet data storage means, the output order indicating an input order of the packet among the plurality of input packets and indicating whether the unicast packet arrives earlier than the multicast packet, and outputting the read data through the output port, wherein the output order identification information is a serial number indicating input orders of all packets input through all input ports, or a serial number indicating input orders of all packets output through each output port.

13. A packet transfer path control apparatus which controls a transfer of a unicast packet and a multicast packet, comprising:

output port determination means for determining an output port through which a packet input from any of one or more input ports is to be output;

pointer storage means for storing for each output port a pointer to a last input one of unicast packets to be output through the output port, or packet management information about the last input unicast packet;

packet data storage means for storing data of a plurality of input packets including both the unicast packet and the multicast packet;

a plurality of packet output means provided for a plurality of output ports for reading data of a packet determined by said output port determination means to be output through the output port in an output order for guarantee of an input/output order of the unicast packet and the multicast packet based on stored contents of said pointer storage means from said packet data storage means, the output order indicating an input order of the packet among the plurality of input packets and indicating whether the unicast packet arrives earlier than the multicast packet, and outputting the read data through the output port.

* * * * *